United States Patent
Chopdekar et al.

(10) Patent No.: US 11,556,717 B2
(45) Date of Patent: Jan. 17, 2023

(54) SYSTEMS AND METHODS FOR SENTIMENT ANALYSIS OF MESSAGE POSTING IN GROUP CONVERSATIONS

(71) Applicant: Avaya Management L.P., Santa Clara, CA (US)

(72) Inventors: Sandesh Chopdekar, Pune (IN); Pushkar Yashavant Deole, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 17/070,660

(22) Filed: Oct. 14, 2020

(65) Prior Publication Data
US 2022/0114344 A1 Apr. 14, 2022

(51) Int. Cl.
| | |
|---|---|
| *G06F 40/30* | (2020.01) |
| *H04L 51/214* | (2022.01) |
| *H04L 51/18* | (2022.01) |
| *G06K 9/62* | (2022.01) |

(52) U.S. Cl.
CPC .......... *G06F 40/30* (2020.01); *G06K 9/6267* (2013.01); *H04L 51/18* (2013.01); *H04L 51/214* (2022.05)

(58) Field of Classification Search
CPC ......... G06F 40/30; H04L 51/14; H04L 51/18; G06K 9/6267
See application file for complete search history.

(56) References Cited

U.S. PATENT DOCUMENTS

| | | | |
|---|---|---|---|
| 2017/0223133 A1* | 8/2017 | Joshi | H04L 67/306 |
| 2019/0333078 A1* | 10/2019 | Bala | G06N 20/00 |
| 2019/0364001 A1* | 11/2019 | Dotan-Cohen | H04L 51/24 |
| 2020/0081965 A1* | 3/2020 | Waters | G06F 40/30 |
| 2020/0089762 A1* | 3/2020 | Fox | G06F 40/166 |
| 2020/0192981 A1* | 6/2020 | Fox | G06F 40/30 |
| 2021/0165842 A1* | 6/2021 | Segal | H04L 51/16 |

OTHER PUBLICATIONS

Wang, Yang, et al. "Privacy nudges for social media: an exploratory Facebook study." Proceedings of the 22nd international conference on world wide web. 2013. (Year: 2013).*

\* cited by examiner

*Primary Examiner* — Soe Hlaing
(74) *Attorney, Agent, or Firm* — Sheridan Ross P.C.

(57) ABSTRACT

The present disclosure provides, among other things, methods and systems of managing communications, the methods and systems including: receiving a first group communication from a first group; determining, based on the first group communication, a first group sentiment; receiving a first communication with a request to send the first communication to the first group; determining, based on the first communication, a first communication sentiment; comparing the first group sentiment with the first communication sentiment; and based on the comparing, performing an action on the request to send the first communication.

20 Claims, 5 Drawing Sheets

SYSTEMS AND METHODS FOR SENTIMENT ANALYSIS OF MESSAGE POSTING IN GROUP CONVERSATIONS

FIELD

Embodiments of the present disclosure relate generally to communication methods and specifically to sharing communications.

BACKGROUND

In today's world, people often spend portions of each day consuming social media. They consume the content by reading, viewing, and listening to it, and then share it with others. People also create their own content to share. People may share content by sending or forwarding it to a group, or often to a social media group. For example, one type of sharing occurs when people like some content, they forward it to one or more groups. In some instances, when people send content to a group, they can post it within the group for other people in the group to read or view, and others in the group also forward the content.

BRIEF SUMMARY

In this way, group communications (also referred to as conversations) on social media have become an integral part of many people's lives. Content can become viral quickly as people (also referred to as users) tend to forward content that they think that others should also see. Content forwarding to groups has become a very common phenomenon and oftentimes people blindly forward content to groups without spending a lot of time considering how the content will be received by others. People may be subscribed to (e.g., be a member of or belong to) several groups. They can forward content that they create, that they receive personally, and that they see in one or more groups, to other groups. People also share or forward content for other reasons. For example, businesses share content for exposure, to provide customer support, to have conversations with customers or communities, to seek out or provide a forum for customer reviews, to notify interested parties of information such as changes to the business, and to advertise, among other reasons.

However, when users send content to share it with one or more groups, they are sometimes not aware of what discussion is happening in the group. Sometimes the forwarded content is not in sync with a current sentiment of the group and a sentiment of the group may conflict with a sentiment of the content that the user wishes to share. When this happens, the forwarded content can be embarrassing to the person who forwarded the content, because it may be perceived as insensitive or rude. In addition, it is becoming more common for businesses to share content on social media. For businesses that are using social media to send advertising content, it is also important for them to know that their content is in sync with a group's sentiment. For these reasons and others, users want their content that they forward, send, and share to be in sync with (or at least not in conflict with) a sentiment of the group in which the content is shared.

If people are aware that a disagreement in sentiment may be a problem, they may first check manually what discussion is going on in the group in order to determine a group sentiment before forwarding the content. Such a process would require a user to manually go through the content within the group, and to understand and consistently rate each message for all content in each message and groups of messages in order to determine a sentiment of the group before sharing the content. However, this is a problematic, cumbersome, and time-consuming process. This process is problematic because it may be necessary to look at every piece of information associated with a group and it can be difficult to keep track of what content has been read and considered. Also, the ratings of sentiment need to be consistent enough to be accurate. A manual process may miss some of the content within a group, especially if new content is being posted quickly, and this can cause any sentiment analysis to be inaccurate. Additionally, a manual process is cumbersome and time consuming because there is typically a large amount of content that a user must sort through and rate, and if the number of messages is very large, it is not practical.

Another problem is that, if content is machine-forwarded, it is often not possible for people to manually check a group's sentiment because, for example, the message forwarding is done automatically without human involvement. Further, if people want to forward content to many groups, checking the sentiment of many groups can become impractical because content is posted in groups during an ongoing basis and therefore the sentiments within the groups may change constantly and/or quickly.

Thus, there is a need for methods and systems that enable faster and more accurate analysis of communication and sentiment data, and faster and more accurate decisions on actions to take based on the data analysis (e.g., rules). The communication data may include social media data, and there is a need for methods and systems that can analyze content from social media sources (e.g., one or more social media groups) as well as analyze any new content that a user wishes to post to the social media, and then determine what actions to take based on the one or more analyses (e.g., comparing results of the multiple analyses to determine whether to post the new content to a social media group, or not, based on a comparison of the sentiments of the new content and the social media group).

Sending content means transmitting the content to a destination, where at the destination the content may be accessed (e.g., consumed, which includes being read, viewed, and/or listened to) by one or more receiving users (also referred to herein as simply "users"). A final result of the sending may be that the content reaches a destination where it is consumed; for example, the content may be published at a destination where it is accessible by one or more users. A user who sent the content may also be able to consume it at the destination, along with other users. However, content that is sent may be stopped (e.g., interrupted, blocked, etc.) or intercepted (e.g., at a receiving server, an intermediate server, or a destination server) before it reaches its final destination, so that the content isn't accessible by receiving users until after it has continued to be sent after being stopped or interrupted. For example, the content may be sent to a destination, but the content may be stopped before it reaches its destination; actions (such as a sentiment analysis and comparison) may be performed on the content while it is stopped; and then a decision may be made (based on the actions) regarding whether to send the content to the destination. Thus, there may be multiple steps of "sending" and although a content is "sent," it may not reach the intended destination until it is "sent" again. If the actions determine that the decision is to not send the content to the destination, then the content may not be sent further after being stopped. The content may be saved for later use, deleted, or returned to a sending user (sometimes with a notification). Sending may also be referred to herein as forwarding, sharing, posting, communicating, and transmitting. Similarly, to send may also be referred to herein as to forward, to share, to post, to communicate, and to transmit. In various embodiments, the word "post" may be used to refer to content that is published to a social media group (e.g., displayed in the group).

There is a need to analyze new content that a user wants to communicate to a group in order to share the content with group members, because the user likely does not want the content to conflict with a sentiment of the group. This can be particularly true when a user wishes to send content via social media because oftentimes people desire to make positive connections on social media. Thus, a user would like to know that the content that the user wishes to send does not conflict with the sentiment currently existing in the social media group to which the user wishes to share the new content. The analysis of the new content may advantageously include a determination of a sentiment of the new content and a determination of a current sentiment of the social media group, as well as a comparison of the sentiment of the new content with the current sentiment of the social media group.

Advantageously, embodiments disclosed herein can determine current sentiments of multiple groups on an on-going basis (e.g., as the content of each group changes, the analysis is updated to maintain an accurate current sentiment of each group) so that any new content that a user desires to send to one or more groups can be analyzed and compared to the current sentiment(s) of each of the groups. A determination of one or more actions to take may be made based on the analyses. Actions, as described herein, include non-actions (e.g., although new content was sent to be posted, it may have a non-action that occurs after the analysis, such as not posting, not forwarding, not sending, not communicating, not sharing, etc.) so that the content does not reach its destination (e.g., it is not continued to be sent to the destination, it is not published at the destination, it is not displayed at the destination, it is not posted at the destination, etc.).

Various embodiments satisfy a need for sentiment analysis that identifies the current sentiment of one or more groups on an on-going basis (e.g., continuously). This continuous analysis may be done automatically without human input. For example, once a group sentiment is initially determined via human input or via machine learning (or a combination of both), any new content posted to the group can be analyzed (and compared with other group content, in some embodiments) to update, if it is determined to be necessary, the current sentiment of the group. Other sentiment data or communication data may also be updated. A current sentiment is also referred to herein as a latest sentiment, an overall sentiment, and an existing sentiment.

In some embodiments, a sentiment of new content that is forwarded to the group may be set as the current sentiment of the group in which the content is posted. Embodiments described herein can apply to new content that is original to a user (e.g., content created by a user, including self-written messages) as well as new content that is forwarded, copied, or partially copied (e.g., not original). New content refers to content that is newly posted to a group, although it can have also been previously posted to the group by the same user or by a different user. Notifications, including warnings, may be provided to a user (e.g., sent or displayed) if the sentiment of the new content meets a certain rule, including if the new content will not be sent to the group based on the analysis.

Notifications may include an option (e.g., a query) to the user that affects an action to be taken regarding the new content. For example, the notification can provide information about the sentiment of the new content (e.g., that the sentiment is not similar to a group sentiment, that the sentiment is antonymous to (or opposite from) a group sentiment, that the sentiment is not allowed due to one or more policies, etc.) and ask the user if the user would like to continue to post the new content to the group. If the user decides to continue to post the new content, then the new content can be posted to the group in spite of the notification. In some embodiments, the user can select to post the new content even if one or more policies regarding the new content state that the new content should not be posted.

In some embodiments, data mining and machine learning tools and techniques are used to manage information, including analyzing content and determining sentiment. For example, data mining and machine learning may be used to determine communication information and sentiment information for various pieces of content (including text, audio, and/or visual data), to analyze the information, including comparing the sentiment information, and to manage information. Machine learning based models can have information about synonyms and antonyms associated with sentiments, for example, so they can identify synonymous and antonymous sentiments, as well as levels of synonymy (e.g., that a word may be more synonymous to one word than another). In some embodiments, levels of synonymy can correspond to weight scores. For example, the sentiments of sadness and grief may be classified as synonymous to the sentiment of anguish. However, the sentiment of grief may be more synonymous to the sentiment of anguish than the sentiment of sadness is to the sentiment of anguish. Likewise, if weight scores are assigned to these sentiments, a weight score of anguish may be closer to a weight score of grief than a weight score of sadness is to the weight score of grief (e.g., anguish may have a weight score of 90, grief may have a weight score of 80, and sadness may have a weight score of 55). Any of the information may be modified and act as feedback to the system. This may be done without human input.

Various embodiments disclosed herein use machine learning together with natural language processing. This processing may use aspect-based sentiment analysis. Some embodiments use specialized sentiment analysis models. Such models can find not only polarity (e.g., positive, negative, and neutral) of sentiments but also feelings and emotions (including angry, happy, sad, excited, etc.).

In various aspects, scores related to communication information and/or sentiment information may be used. Such scores can include scores for weight, time, and/or confidence, among others. One or more weight, time, and confidence score may be determined by a user, obtained from another source, and/or determined by machine learning. Similarly, rules related to the scores may be set by a user, obtained from an outside source, and/or set by machine learning.

The weight score may be related to an intensity or a type of sentiment; for example, a sad sentiment may have a lesser weight than a grief sentiment, and each of these may have a lesser weight than an anguish sentiment. A confidence score can indicate how accurate the determination of the sentiment may be. It can include a scale of confidence, or include various categories, such as very high, high, medium, low. The time score can be related to any type of information and can be related to a type of sentiment. The time score may be in direct proportion to the weight (e.g., the higher the weight, the greater the time score). The time score may be set as a property of content or of a group, and may be an indicator of how long the sentiment will prevail in the group. The scores may each be determined based on any type of information (e.g., rules, thresholds, etc.), and may be related or unrelated to one another. For example, a time score may be set based solely on a weight score, so that for a weight of one, the time may be set as an expiration time of one hour. Then, the sentiment having the weight of one is set as the group sentiment, and the sentiment is set to expire in one hour, at which point in time an action may be taken or a different sentiment may be set as a current sentiment. In some embodiments, the group may have a sentiment of neutral set until new content is posted in the group, at which time the group sentiment may be set to that of the new content, or an additional sentiment analysis may occur for the group (e.g., to compare the one or more sentiment of the newly posted content with one or more sentiments of content posted in the group).

Various embodiments can use one or more of sentiment policies, a sentiment analyzer, and a sentinel. The sentiment policies are policies regarding communication information and sentiment information, including identified sentiments, rules, thresholds, scores, and group information. The sentiment analyzer may include machine learning and may continuously monitor and classify content, including new content of a group and/or new content being sent by a user, and classify the content to be associated with various sentiments. The sentinel can continuously fetch sentiments that are determined by the sentiment analyzer and manage current sentiments. In some embodiments, a sentiment having a highest weight will be a current sentiment or an overall sentiment of the related group and/or content.

The sentiment analyzer can identify a sentiment of content by analyzing one or more portions of the content. For example, content may include any type of visual (including images and textual) and audio content. Each piece or pieces of content (e.g., each portion of text, video, and/or audio within a piece of content) may be analyzed for sentiment. In some embodiments, the sentiment analyzer may determine a weight score for each sentiment and rank the sentiments that are detected for each portion of content (e.g., each of the communications received for a group within a certain timeframe, or each piece of content within the most recent communication received, etc.) in order of their weight scores, and then rank all of the portions of content and their associated sentiments. In various embodiments, the content having the associated sentiment with the highest weight score is determined to be the current sentiment of the content, and may be set as the current sentiment of the group.

In various embodiments, a confidence score may also be taken into consideration. For example, a sentiment may not be considered as an option for a current sentiment if a confidence score for how likely it is that the determined sentiment accurately reflects an overall sentiment of the content is below a specified threshold. In some aspects, if the confidence score of content is below a threshold, then certain actions may be taken. For example, if a confidence score of new content being sent to be posted is below a threshold, a policy may include sending a notification to a user who is sending the new content and not blocking the new content from being posted.

Sentiment classification may be done using any type of method or system. For example, Plutchik's Wheel of Emotions may be used to determine classifications of sentiments, relationships between sentiments, and synonyms and antonyms for sentiments. Sentiments may be classified into basic sentiments, where various sentiments correspond to at least one basic sentiment. Sentiments that correspond to a same basic sentiment (or, in some embodiments, a same or similar basic sentiment) may be determined to be synonymous, to be in sync, to match, to be in consonance, to be the same, or to be in agreement. Alternatively, sentiments may be determined to be in disagreement, to be antonyms, or to be opposite from one another. In some embodiments, based on a level of agreement or disagreement, sentiments can be determined to be synonymous or antonymous to one another. In some embodiments, sentiments may be defined as synonyms and antonyms and/or also whitelisted and blacklisted. Policies that classify and identify the sentiments may be stored in, and provided by, a database of sentiment policies. Users and/or machine learning can configure and manage sentiment classification via sentiment policies and rules The sentinel may fetch sentiment policies that classify the sentiments (e.g., these classifications may be based on the classifications described in Plutchik's Wheel of Emotions) for use in the methods and system disclosed herein.

The sentiment policies can contain classifications that may be used in various combinations of rules. For example, if a sentiment of a new post is a whitelisted sentiment, then the post can be allowed in any group at any time. If a sentiment of a new post is a blacklisted sentiment, then the post can be prevented from being posted anywhere, or it can be prevented from being posted until after a notification is sent to the user and the user selects to proceed. If a sentiment of a group is a whitelisted sentiment, then any post can be allowed in the group at any time. If a sentiment of the group is a blacklisted sentiment, then one or more posts (e.g., all posts except for those with a sentiment that matches the current sentiment of the group) can be prevented from being posted to the group for a specified amount of time.

The sentinel can continuously fetch sentiments (together with any associated weight, time, and/or confidence scores) that are determined by the sentiment analyzer. The sentinel can manage current sentiments. In various embodiments, as described herein, the sentiment having the highest weight is set as the current sentiment for a group. Similarly, the sentiment having the highest weight for different sentiments detected in a piece of content may be set as the sentiment of the content. The sentinel may also include an antonym and synonym checker to determine whether two sentiments are synonymous or antonymous to each other. A time score may correspond with the weight score. The sentinel may manage timers and the sentinel can set timers with an amount of time corresponding to the time score to manage current sentiments of groups. The timer may start at any time, such as when content is posted, when content is sent, when content is received, etc. When the time expires, the sentinel may set the current sentiment of the group as neutral.

In various embodiments of methods and systems disclosed herein, when a user sends new content to a group, the sentinel may provide the new content to the sentiment analysis engine before sending the new content to the group. The sentiment analysis engine may analyze the new content to determine a sentiment for the new content and provide the decision of the sentiment of the new content to the sentinel. For example, if there are multiple sentiments associated with the new content because of multiple pieces or types of content (e.g., different words, text strings, and/or images), the sentiment analysis engine may rank the sentiments according to their weight scores and confidence scores, and then select a top ranked (by weight) sentiment that has a sufficient confidence score as the sentiment of the new content. The sentinel may have already set a current sentiment of the group (e.g., as it was previously determined by the sentiment analysis engine) and the sentinel may compare the current sentiment of the group with the sentiment of the new content. Alternatively, the sentinel may be aware of the sentiment of new content before it obtains the current sentiment of the group to which the new content is being sent.

In some embodiments, the comparison of the sentiment of the new content with the sentiment of the group may include comparing the sentiment of the new content to an synonym/antonym checker to determine whether the sentiment of the new content is synonymous or antonymous to the sentiment of the group, how synonymous the sentiment of the new content is to the sentiment of the group, and/or how antonymous the sentiment of the new content is to the sentiment of the group. In various embodiments, the comparison can determine that the sentiment of the new content is not opposite from the sentiment of the group (e.g., if the sentiment of the new content is an antonym to the sentiment of the group, then it is determined that the sentiment of the new content is opposite from the sentiment of the group). Rules may be implemented if the sentiment of the new content is a synonym or antonym to the sentiment of the group. The comparison may also compare other information. For example, the sentiment of the new content to the sentiment of the group to determine if the sentiment of the new content has a higher weight. If the sentiment of the new content has a higher weight than the sentiment of the group and is not an antonym to the sentiment of the group, then the sentinel engine allows the new content to be posted to the group. In addition, the sentiment of the new content may be set by the sentinel as the current sentiment of the group when the new content is posted to the group.

In some aspects, if a sentiment of the new content is opposite to a current sentiment of the group but the sentiment of the new content carries a higher weight than the current sentiment of the group, then the new content is allowed to be posted. For example, if the current sentiment of the group is happy and a user sends a message (e.g., new content) to the group about a sad demise of a group member, then the message is allowed to be posted to the group because the new content, even though it has a sentiment that is opposite to the current sentiment of the group, has a higher weight score. Thus, methods and systems as described herein may determine that it is necessary to post the message to the group based on the higher weight score.

In some aspects, a minimum margin (also referred to herein as a sentiment change factor) may be kept. The minimum margin may be a threshold where a rule associated with the threshold changes actions of the sentiment analysis engine and/or the sentinel. Sentiment change factors may be set by users and/or machine learning, and may be stored in the sentiment policies and/or in other databases associated with the system. A sentiment change factor may be used when a current sentiment of a group is being analyzed, where the sentiment change factor determines whether a new sentiment replaces the current sentiment. For example, in various embodiments, a new sentiment for new content sent to be posted to a group must have at least a 10% higher weight score than a current sentiment of the group in order to be set as the current sentiment. This rule regarding such a change factor can be applied whether the new content is synonymous to a current sentiment, or whether it is antonymous to the current sentiment.

Various embodiments can use the properties and scores in a multitude of ways. For example, if the weight of a new sentiment for a new post to a group is lower than a weight of a current sentiment in the group, then the following comparison may be performed: if the sentiments match (e.g., they are the same sentiment) or are in consonance (e.g., they are synonymous), then the post is allowed; if the sentiments are not a good match, they are not synonymous, or they are opposite, then the user is notified or an action is taken per the sentiment policies (e.g., the new post is not sent to the group). In some cases, even if the sentiment of new content is opposite, a weight score of the sentiment of the new content can be used to determine if the sentiment should override the current sentiment of group. For example, if the weight of a new sentiment for a new post to a group is higher than a weight of a current sentiment in the group, then the new post is allowed (e.g., the new post is sent to the group) regardless of whether the new sentiment is synonymous or antonymous to the current sentiment in the group. In some embodiments, if the sentiments are opposite to each other, then the post is disallowed, or not sent, and the user is notified per the sentiment policies. Notifications may be sent to one or more users in any of these scenarios.

Examples of sentiment policies include maintaining a sentiment analysis of content that is changing. For example, group content (including social media content) may change often due to users posting new content. The sentiment policies may maintain current sentiment information for the groups by performing a sentiment analysis on new content as soon as it is received by the group (e.g., posted in the group, transmitted to the group, sent to the group, etc.) and using the sentiment analysis to determine whether to change any properties related to the current sentiment of the group. In some aspects, a current sentiment may be changed and/or a timer may be adjusted (e.g., reset, started, or stopped) when changing the current sentiment.

Examples of sentiment policies also include a rule that if a new content that a user sends to be posted to a social media group is analyzed prior to the new content being posted in the social media group, and the new content is an opposite sentiment from a current sentiment of the group or is a blacklisted sentiment, then the new content is not allowed to be displayed in the social media group and a notification is provided to the user. Another sentiment policy could be that if the new content is forwarded to the group and it is unrelated to a current sentiment of the group, then the new content is not allowed to be posted to the group until after a notification is sent to the user and a timer associated with the current sentiment of the group expires. In some embodiments, the new content may be posted automatically when the timer expires. Another sentiment policy could be to provide a notification to a user if new content that the user attempts to post to a group is not in sync with a current sentiment of the group. Yet another illustrative rule is that if new content that a user sends to be posted to a social media group is analyzed prior to the new content being posted in the social media group, and the new content is an opposite sentiment from a current sentiment of the group, then a weight of the new content is compared with a weight of the current sentiment of the group, and if the weight of the new content is greater than (or greater than by a certain amount) a weight of the current sentiment of the group, then the new content is sent to the social media group. As discussed herein, a notification can be sent to the user posting the new content regarding an analysis and/or status of the post. In various embodiments, the notification may give an option to the user to decide to not post the new content or to decide to proceed with posting the new content even if the policies state that the new content should not be posted.

In various embodiments, the method and systems described herein allow for a user to fetch sentiment of one or more groups. For example, an application programming interface (API) may be accessed by a user via their communication device and provide an interface for the user to request a current sentiment of one or more groups. One or more components of the systems described herein may obtain historical information related to the group (e.g., historical group communications) and analyze the information to obtain a current sentiment from the information, then provide the current sentiment, or any other sentiment and communication information (such as timing) to the user who submitted the request. In some embodiments, the API may be a REpresentational State Transfer (REST) API. These embodiments may be useful for business users, who desire to post communications and do not want to be out of sync with a group sentiment when the communication is posted.

Embodiments disclosed herein are advantageous because, for example, they improve data analyzing and communicating, and thereby assist users in taking a desired action (or non-action). The methods and systems disclosed herein can allow users to perform desired actions that would otherwise be impossible or impracticable, including to continuously analyze sentiment in one or more groups and make decisions about whether or not to forward content to a group based on the sentiment analysis. The methods and systems disclosed herein allow improved communications resulting from a faster and more consistent understanding of sentiments in data and a faster, more efficient, and more consistent analysis of the sentiments, as well as improvement in actions that are taken as a result. The methods and systems disclosed herein allow users to quickly and thoroughly analyze communications and sentiment information and to make decisions using the sentiment information in order to reduce costly errors or missteps in communications, to reduce costly work to fix the errors or missteps, and to reduce damage to a brand or reputations that can result from the errors or missteps. Advantageously, the methods and systems disclosed herein may be performed and implemented automatically, without user input.

Thus, the systems and methods disclosed herein advantageously include embodiments that analyze communication and sentiment information to take action or make recommendations based on the analysis of the communication and sentiment information. Advantageously, embodiments may also automatically perform an analysis of sentiment information and also take action or make recommendations without user input. In various aspects, a learning engine may be used that is capable of learning what has been done on information by users and does the same thing (e.g., analyzes sentiment to make decisions regarding communications) and/or adjusts actions based on the learning.

These and other needs are addressed by the various embodiments and configurations of the present disclosure. As described herein, the present disclosure can provide a number of advantages depending on the particular configuration. These and other advantages will be apparent from the disclosure contained herein.

According to some aspects of the present disclosure, methods of managing communications include: receiving a first group communication from a first group; determining, based on the first group communication, a first group sentiment; receiving a first communication with a request to send the first communication to the first group; determining, based on the first communication, a first communication sentiment; comparing the first group sentiment with the first communication sentiment; and based on the comparing, performing an action on the request to send the first communication.

In some embodiments, if the comparing finds an agreement between the first group sentiment and the first communication sentiment, then the action includes forwarding the first communication to the first group, and where if the comparing finds a disagreement between the first group sentiment and the first communication sentiment, then the action includes not forwarding the first communication to the first group and notifying a sender of the first communication.

In some embodiments, the first group sentiment includes a type of sentiment and a weight score.

Another aspect of the disclosure is that the methods further include: setting a current sentiment of the first group based on the determining the first group sentiment; and setting a timer for the current sentiment in the first group, where an amount of the timer is based on the weight score.

In some embodiments, before the determining the first group sentiment, the first group has a current sentiment, and the determining the first group sentiment further includes: receiving a new group communication in the first group; determining a sentiment of the new group communication; and comparing the current sentiment to the sentiment of the new group communication to determine the first group sentiment.

In some embodiments, before the determining the first group sentiment, the first group has a current sentiment, and the determining the first group sentiment further includes: receiving a new group communication in the first group; determining a sentiment of the new group communication; and comparing the current sentiment to the sentiment of the new group communication to determine the first group sentiment, which then overrides the current sentiment and becomes the current group sentiment.

Another aspect of the disclosure is that the methods further include: determining a first weight score for the current sentiment; and determining a second weight score for the sentiment of the new group communication, where the comparing the current sentiment to the sentiment of the new group communication includes comparing the first weight score and the second weight score.

Another aspect of the disclosure is that the methods further include: determining a first weight score for the current sentiment; and determining a second weight score for the sentiment of the new group communication, where the comparing the current sentiment to the sentiment of the new group communication includes comparing the first weight score and the second weight score. In various aspects, the weight score can be used to determine if the first communication having the first communication sentiment that is in disagreement with the first group sentiment should override the first group sentiment so that the first communication is forwarded to the group and the first communication sentiment becomes the group sentiment.

Another aspect of the disclosure is that the methods further include: determining a confidence score for the first communication sentiment; determining a weight score for first the communication sentiment; and determining a time score for the first the communication sentiment, where the time score is based on the weight score.

In some embodiments, the comparing determines that the first communication sentiment disagrees with the first group sentiment, and if the weight score is below a first threshold, then the action includes not sending the first communication to the first group.

Another aspect of the disclosure is that the methods further include: determining a weight score for the first communication sentiment; and comparing the weight score to a first threshold before the performing the action.

In some embodiments, the first group is a social media group, the social media group has members of the group, and a sender of the request to send the first communication is a member of the members.

In some embodiments, a first text string is associated with the first communication and a first image is associated with the first communication, and the determining the first communication sentiment includes a first sentiment analysis of the first text string and a second sentiment analysis of the first image.

In some embodiments, at least one of the determining the first group sentiment and the determining the first communication sentiment includes an aspect based sentiment analysis.

Another aspect of the disclosure is that the methods further include: storing a property of the first group communication in a database of sentiment decisions; enabling a machine learning process to analyze the database of sentiment decisions; and updating a data model to automatically perform, based on the analysis performed by the machine learning process, an analysis of sentiment properties including the property of the first communication.

Another aspect of the disclosure is that the methods further include: determining a weight score for the first communication sentiment; and comparing the weight score to a first threshold before the performing the action, where the comparing the weight score to the first threshold is performed by the machine learning process.

In some embodiments, the first threshold is determined by the machine learning process.

According to some aspects of the present disclosure, communication systems include: a processor; and computer memory storing data thereon that enables the processor to: receive a first group communication from a first group; determine, based on the first group communication, a first group sentiment; receive a first communication with a request to send the first communication to the first group; determine, based on the first communication, a first communication sentiment; compare the first group sentiment with the first communication sentiment; and based on the comparing, perform an action on the request to send the first communication.

In some embodiments, a first text string is associated with the first group communication and a first image is associated with the first group communication, and the determining the first group sentiment includes a first sentiment analysis of the first text string that determines a first text string sentiment and a second sentiment analysis of the first image that determines a first image sentiment.

In various embodiments, additional content may be associated with content, or may include the content. The additional content may be a file, such as a video file and/or an audio file, emojis, stickers, and/or reactions to content. Thus, communications may include and are not limited to any type of electronic communication, a message, a video message, an audio message, a text messages, a mixed media message, an image, an emoji, an audio file, a video file, etc.

In some embodiments, a first text string is associated with the first communication and a second text string is associated with the first communication, and the determining the first communication sentiment further includes: a first sentiment analysis of the first text string; a second sentiment analysis of the second text string; and a comparison of a result of the first sentiment analysis with a result of the second sentiment analysis.

In some embodiments, the determining the first group sentiment includes an aspect based sentiment analysis.

According to some aspects of the present disclosure, systems include: a microprocessor and a computer-readable medium coupled thereto, where the microprocessor receives and executes instructions from the computer-readable medium and where the instructions cause the microprocessor to: receive a first group communication from a first group; determine, based on the first group communication, a first group sentiment; receive a first communication with a request to send the first communication to the first group; determine, based on the first communication, a first communication sentiment; compare the first group sentiment with the first communication sentiment; and based on the comparing, perform an action on the request to send the first communication.

According to some aspects of the present disclosure, methods include: receiving a group communication from a group; determining, based on the group communication, a group sentiment; receiving a communication with a request to send the communication to the group; determining, based on the communication, a communication sentiment; comparing the group sentiment with the communication sentiment; and based on the comparison of the group sentiment with the communication sentiment, performing an action on the request to send the communication.

In some embodiments, if the comparison of the group sentiment with the communication sentiment finds an agreement between the group sentiment and the communication sentiment, then the action includes forwarding the communication to the group, and if the comparison of the group sentiment with the communication sentiment finds a disagreement between the group sentiment and the communication sentiment, then the action includes not forwarding the communication to the group and notifying a sender of the communication.

In some embodiments, the group sentiment includes a type of sentiment and a weight score.

Another aspect of the disclosure is that the methods further include: setting a current sentiment of the group based on the determining the group sentiment; and setting a timer for the current sentiment in the group, where an amount of the timer is based on the weight score.

In some embodiments, before the determining the group sentiment, the group has a current sentiment, and the determining the group sentiment further includes: receiving a new group communication in the group; determining a sentiment of the new group communication; and comparing the current sentiment to the sentiment of the new group communication to determine the group sentiment.

In some embodiments, the group sentiment includes a weight score, the comparison of the group sentiment with the communication sentiment finds a disagreement between the communication sentiment and the group sentiment, and the action is to forward the communication to the group based on the weight score.

Another aspect of the disclosure is that the methods further include: determining a confidence score for the communication sentiment; determining a weight score for the communication sentiment; and determining a time score for the communication sentiment, where the time score is based on the weight score.

In some embodiments, the comparison of the group sentiment with the communication sentiment determines that the communication sentiment disagrees with the group sentiment, and if the weight score is above a threshold, then the action includes posting the communication to the group.

Another aspect of the disclosure is that the methods further include: determining a weight score for the communication sentiment; and comparing the weight score to a threshold before the performing the action.

In some embodiments, the group is a social media group, the social media group has members of the social media group, and a sender of the request to send the communication is a member of the members.

In some embodiments, a text string is associated with the communication and an image is associated with the communication, and the determining the communication sentiment includes a first sentiment analysis of the text string and a second sentiment analysis of the image.

In some embodiments, at least one of the determining the group sentiment and the determining the communication sentiment includes an aspect based sentiment analysis.

Another aspect of the disclosure is that the methods further include: storing a property of the group communication in a database of sentiment decisions; enabling a machine learning process to analyze the database of sentiment decisions; and updating a data model to automatically perform, based on the analysis performed by the machine learning process, an analysis of sentiment properties including the property of the communication.

Another aspect of the disclosure is that the methods further include: determining a weight score for the communication sentiment; and comparing the weight score to a threshold before the performing the action, where the comparison of the weight score to the threshold is performed by the machine learning process.

In some embodiments, the threshold is determined by the machine learning process.

According to some aspects of the present disclosure, systems include: a processor; and computer memory storing data thereon that enables the processor to: receive a group communication from a group; determine, based on the group communication, a type of group for the group, where the type of group includes a policy; receive a communication with a request to post the communication to the group; determine, based on the communication, a communication sentiment; compare the policy with the communication sentiment; and based on the comparison of the policy with the communication sentiment, perform an action on the request to post the communication.

In some embodiments, the policy includes a rule about a basic sentiment, the communication sentiment has a relationship to the basic sentiment, and the action is determined by the rule and the relationship.

In some embodiments, the type of group of the group is determined by a machine learning process.

In some embodiments, the determining the group sentiment includes an aspect based sentiment analysis using a machine learning process.

According to some aspects of the present disclosure, systems include: a microprocessor and a computer-readable medium coupled thereto, where the microprocessor receives and executes instructions from the computer-readable medium and where the instructions cause the microprocessor to: receive a group communication from a group; determine, based on the group communication, a group sentiment; receive a communication with a request to post the communication to the group; determine, based on the communication, a communication sentiment; compare the group sentiment with the communication sentiment of the communication of the request; and based on the comparison of the group sentiment with the communication sentiment, perform an action on the request to post the communication.

As used herein, information may include data, and includes communication information and sentiment information. Information includes various types of communications that are multiple electronic records, text, rich media, or data structures. Types of communications include messages and posts (including social media posts). Information may be referred to as content. Communications may be data that is stored on a storage/memory device, and/or transmitted from one communication device to another communication device via a communication network. A communication may be transmitted via one or more data packets and the formatting of such data packets may depend upon the messaging protocol used for transmitting the electronic records over the communication network. Information may contain different types of information, which is also referred to as content and data herein.

Sentiment information may also be referred to as sentiment data and may include properties of opinions, emotions, and mental feelings, such as labels, intensities, and names. Sentiment information may include and is not limited to types of sentiments and other properties associated with the information such as determining scores associated with the sentiments including a weight score, time score, and/or confidence score, as well as other properties associated with the sentiments.

As used herein, a data model may correspond to a data set that is useable in an artificial neural network and that has been trained by one or more data sets that describe conversations or message exchanges between two or more entities. The data model may be stored as a model data file or any other data structure that is useable within a neural network or an Artificial Intelligence (AI) system.

As used herein, the term action refers to various types of actions, including but not limited to processing information using processing input to obtain processing decisions as described herein, configuring/forwarding/sending one or more communications, displaying information, determining additional related information and actions to perform, monitoring for matching information, including key words and/or repeated content, monitoring activity of one or more users and/or groups, determining topics and related information (e.g., pieces of content), and interacting with databases.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "analyze," "process," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
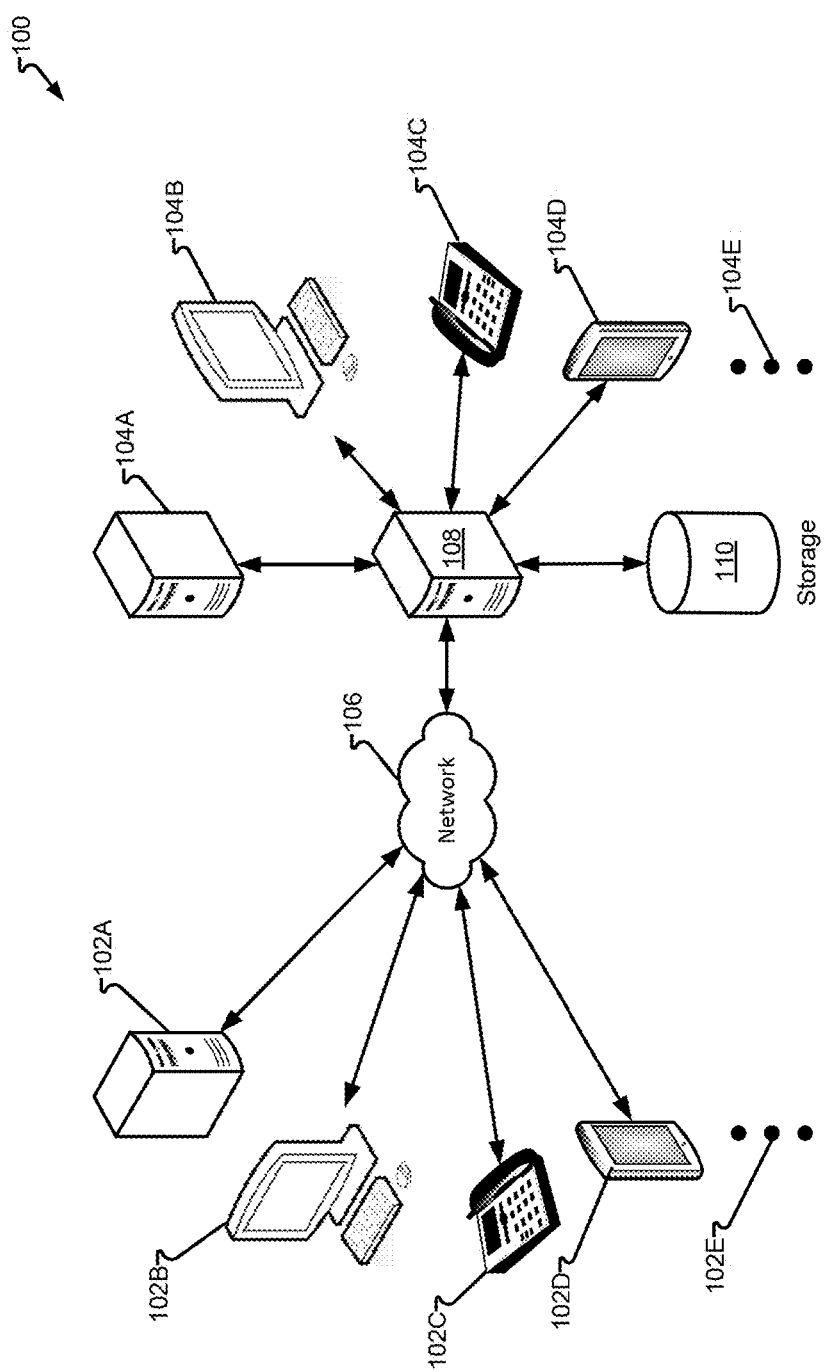
FIG. 1 is a block diagram illustrating a first system in accordance with at least some embodiments of the present disclosure.

FIG. 1 depicts system 100 in accordance with embodiments of the present disclosure. In one embodiment, first user communication device 102 comprises one or more devices and/or device types, such as first user communication device 102A being a server, computer, or other communication component; first user communication device 102B comprising a computer, laptop, or other application-executing device, such as to execute a softphone, messaging system, video/voice-over-IP, etc. First user communication device 102A and first user communication device 102B may operate independently or cooperatively. First user communication device 102C may be embodied as a telephone (e.g., plain old telephone system (POTS) device, and/or a voice-over-IP (VoIP) device); First user communication device 102D may be a handheld device, such as a personal data assistant, cellular telephone/smart-phone, tablet, etc., which may communicate via cellular communications and/or other wired or wireless networking communications (e.g., WiFi, WiMax, Bluetooth, etc.); and other first user communication device 102E which may comprise other current or future communication devices for use by a user (not shown in FIG. 1) to communicate with one or more second user communication device 104.

In another embodiment, second user communication device 104 comprises one or more devices and/or device types, such as second user communication device 104A which may comprise a server, computer, or other communication component; second user communication device 104B, which may comprise a communication terminal with software and/or communications to other components (e.g., processors, storage/memory devices, etc.); second user communication device 104C which may be embodied a telephone (e.g., POTS, VoIP, etc.); second user communication device 104D may be a handheld device, such as a personal data assistant, cellular telephone/smart-phone, tablet, etc., which may communicate via cellular communications and/or other wired or wireless networking communications (e.g., WiFi, WiMax, Bluetooth, etc.); and other second user communication device 104E which may comprise other current or future communication devices for use by a user (not shown in FIG. 1) to communicate with one or more first user communication device 102.

System 100 omits common components typically utilized to facilitate communication between one or more first user communication device 102 and one or more second user communication device 104. The network 106 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks. Network 106 may be or support communications comprising one or more types (e.g., video, analog voice, digital voice, text, etc.) and/or media (e.g., telephony, Internet, etc.). Network 106 may comprise portions of other networks (e.g., ethernet, WiFi, etc.) and/or virtual networks (e.g., VPN, etc.).

Communications between ones of first user communication device 102 and ones of second user communication device 104 may be intercepted or monitored by communication server 108 having a microprocessor with a memory integrated therewith or accessible. Communication server 108 monitors the connection data of the communication and, if a criterion or threshold is met, causes at least a portion of the communication to be stored in data storage 110. For example, images, spoken words, words/characters in a communication, properties regarding the communication, etc., may be intercepted, monitored, scanned, searched, and stored. In another embodiment, data storage 110 may maintain an index, pointer, or other indicia to reference to the portion of the communication. The communication server 108 may include, or communicate with, various other servers, memories, modules, and/or engines to implement methods and systems of the present disclosure. The communication server 108 may interact with a set of guidelines (e.g., as a set of static instructions) or by using machine learning. In various embodiments disclosed herein, the communication server 108 may interact with a sentinel engine and a sentiment analysis engine, as described herein.

Figure 2:
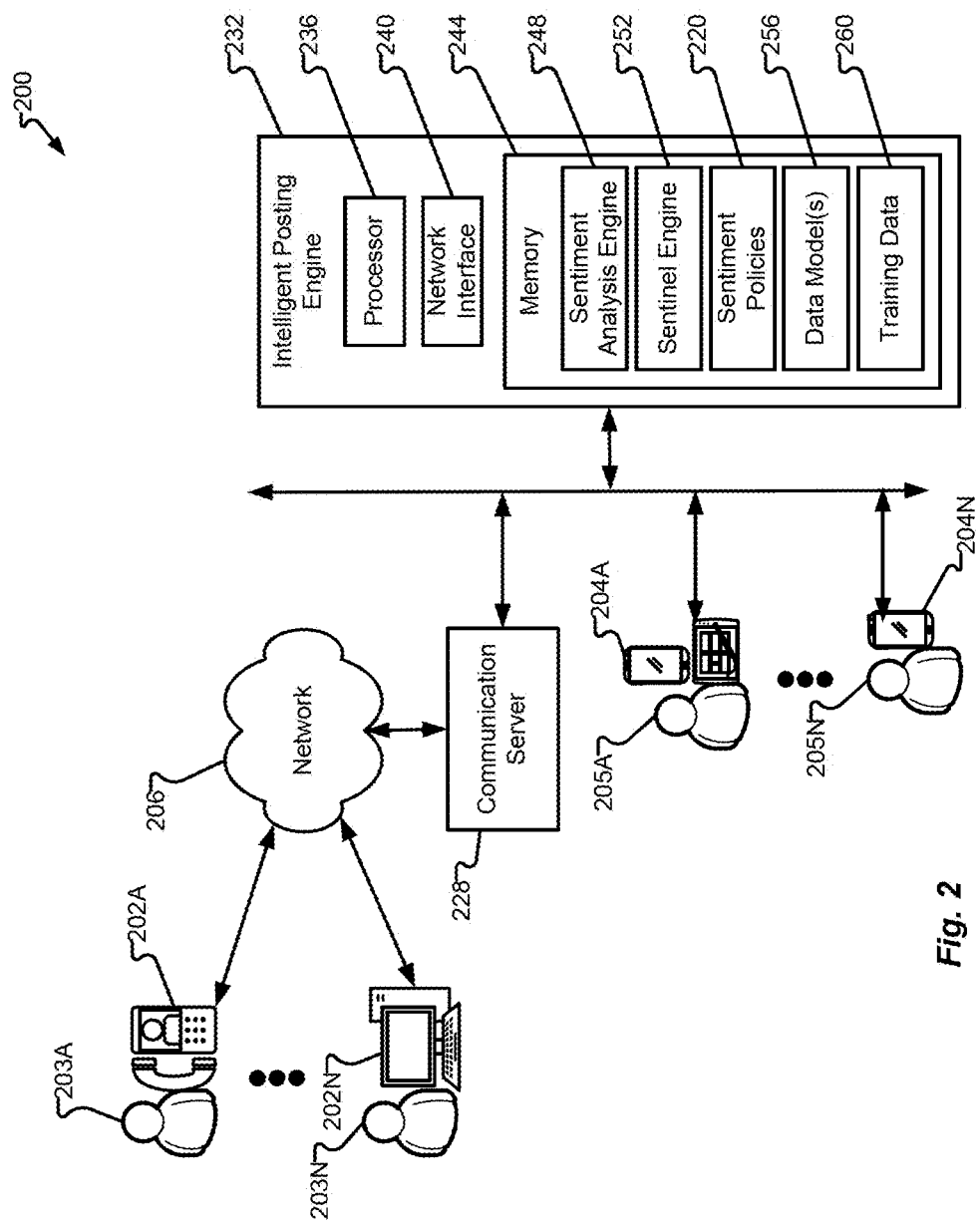
FIG. 2 is a block diagram illustrating a second system in accordance with at least some embodiments of the present disclosure.

Turning to FIG. 2, a communication system 200 will be described in accordance with at least some embodiments of the present disclosure. In some aspects, the components shown in FIG. 2 may correspond to like components shown in FIG. 1. The communication system 200 is shown to include a communication network 206 that interconnects users 203A-203N via communication devices 202A-202N with users 205A-205N via communication devices 204A-204N. Users include, and may be referred to herein as, humans, human agents, administrators, participants, customers, attendees, and entities (such as businesses, organizations, business owners, and employees). The network 206 may connect to communication devices in any manner, including via communication server 228. Thus, any of users 203A-203N and/or 205A-205N may communicate with any of users 203A-203N and/or 205A-205N through their respective devices and communication server 228 in addition to network 206. Communication server 228 may also communicate with intelligent posting engine 232 via a communication channel.

Communication devices as disclosed herein (e.g., 202A-202N and/or 204A-204N) may correspond to a computing device, a personal communication device, a portable communication device, a laptop, a smartphone, a personal computer, and/or any other device capable of running an operating system, a web browser, or the like. For instance, a communication device may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices (e.g., 204A-204N and/or 202A-202N) may also have any of a variety of applications, including for example, a database client and/or server applications, web browser applications, chat applications, social media applications, calling applications, etc. A communication device (e.g., 204A-204N and/or 202A-202N) may alternatively or additionally be any other electronic device, such as a thin-client computer, Internet-enabled mobile telephone, and/or personal digital assistant, capable of communicating via communication network 206 and/or displaying and navigating web pages or other types of electronic documents.

A user (e.g., 203A-203N and/or 205A-205N) may use multiple different communication devices (e.g., multiple of 202A-202N and/or 204A-204N) to communicate via a single asynchronous communication channel. Alternatively, multiple users (e.g., multiple 203A-203N and/or 205A-205N) may use a single or multiple communication devices (e.g., 202A-202N and/or 204A-204N). As a non-limiting example, a user may login to a web-based portal or authenticate themselves with a particular chat channel and then utilize the web-based portal or chat channel to communicate with any one of multiple communication devices (e.g., 204A-204N and/or 202A-202N). Alternatively or additionally, a user may use one of their communication devices (e.g., 204A-204N and/or 202A-202N) to transmit one type of communication and use another communication device to send a communication of another type.

Communications sent by users 203A-203N and/or 205A-205N contain communication information and are associated with communication information. Communication information as used herein may include data, sentiment information, sentiment data, communication information, communication data, and variations of these terms. Information can include any type of data related to communications of a user and/or entity (e.g., information sent to user(s), received from user(s), created by user(s), accessed by user (s), viewed by user(s), etc.). Communication information can include information associated with the communication as well as information contained within the communication (e.g., content of the communication), including information associated with sentiments. Thus, information may include information not only that is sent and received, but also other information such as information that a user does not necessarily send or receive, such as administrative information, preferences, settings, etc. Content of communications may have various types of information associated with the communications, such as a timing of the content, items the content is related to, users the content is related to, key words, and other data within fields of the communication (e.g., to field, from field, subject, body, etc.). The key words or other content may be analyzed based on various properties, including their location as it relates to the communication (e.g., a field location within the communication).

In some embodiments, one or more servers may be configured to perform particular actions specific to supporting functions of the intelligent posting engine 232. For instance, the communication server 228 may correspond to one or more servers that are configured to receive communications and make decisions for the communications, as well as communicate with the sentiment analysis engine 248 and the sentinel engine 252. The communication server 228 may correspond to a single server or a set of servers that are configured to establish and maintain communication channels between users 203A-203N and 205A-205N and may contain processor(s) and memory to store and manage (e.g., create, configure, update, revise, edit, process, delete, display, transmit, and otherwise implement) communications data. In some embodiments, the communication server 228 may work in cooperation with the intelligent posting engine 232 to manage information, as described herein.

The methods and systems for sentiment analysis, as described herein, may be carried out on one or more servers and/or one or more clients, and/or one or more intermediary components (including AI client side processors), or any combination thereof. For example, any one or more of the components described herein, or any combinations of components (e.g., the intelligent posting engine 232, the sentiment analysis engine 248, the sentinel engine 252, and/or any respective processing components associated therewith) can be associated with and/or executed on a social media server, a social media client, or any other intermediary component hosted separately.

In some embodiments, the communication server 228 may be responsible for establishing and maintaining communications including digital text-based communication channels as well as voice channels between users 203A-203N and 205A-205N. The communication server 228 may be configured to maintain state information for one or more users 203A-203N and 205A-205N at any given point in time. The communication server 228 can establish and maintain communication data, including data of social media groups and data related to users. As discussed herein, communication data includes and is not limited to any data involving a user involved in communications, communications of a user, and social media data. Thus, as some non-limiting examples, the communication server 228 may be configured to process social media communications received from a user communication device (e.g., 204A-204N and/or 202A-202N) and utilize a messaging protocol and/or a communication protocol. Non-limiting examples of messaging protocols that may be supported by the communication server 228 include Internet Message Access Protocol (IMAP), Post Office Protocol (POP), Simple Mail Transfer Protocol (SMTP), and Exchange. The communication server 228 may alternatively or additionally be configured to support real-time or near-real-time text-based communication protocols, video-based communication protocols, and/or voice-based communication protocols. Various functionality of the communication server 228 may be performed by the intelligent posting engine 232 and/or other servers and server components such as additional memory and processors (not shown).

It should be appreciated that the communication server 228 may be configured to support any number of communication protocols or applications whether synchronous or asynchronous. Non-limiting examples of communication protocols or applications that may be supported by the communication server 228 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging Protocol (WAMP), SOAP, MIME, Real-Time Messaging Protocol (RTP), Web Real-Time Communications (WebRTC), WebGL, XMPP, Skype protocol, AIM, Microsoft Notification Protocol, VoIP, email, etc. Again, in addition to supporting text-based communications, the communication server 228 may also be configured to support non-text-based communications such as voice communications, video communications, and the like.

The intelligent posting engine 232, components thereof, and/or the communication server 228 may also be configured to manage and analyze historical information. Historical information may be used as part of training and updating automated engines (e.g., an intelligent posting engine 232, a sentiment analysis engine 248, and/or a sentinel engine 252).

In some embodiments, the communication server 228 may further interact with the intelligent posting engine 232, the sentiment analysis engine 248, the sentinel engine 252, and/or the sentiment policies 220 to configure communications in accordance with the methods and systems disclosed herein. These capabilities of the communication server 228 may be provided by one or more modules stored in memory and executed by one or more processors of the communication server 228.

In addition, the communication server 228 may be responsible for obtaining user 203A-203N and/or 205A-205N information from various sources (e.g., communications, social media posts, presence statuses, state information, entity information, etc.) to support the methods and systems disclosed herein. In some embodiments, the communication server 228 may be configured to maintain a communications database that may be internal to, or external from, the communication server 228. The communications database (not shown in FIG. 2) may be used to store communications information in any number of data formats.

The intelligent posting engine 232 may be configured to coordinate tasks between the intelligent posting engine 232, the sentiment analysis engine 248, and/or the sentinel engine 252. The intelligent posting engine 232, the sentiment analysis engine 248, and/or the sentinel engine 252 may have any configuration and may be made up of more or less components than what is shown in FIG. 2. For example, the intelligent posting engine 232 may perform all of the tasks of the sentiment analysis engine 248 and/or the sentinel engine 252. Also, each of the sentiment analysis engine 248 and the sentinel engine 252 can perform tasks independently, without interacting with the intelligent posting engine 232. In various embodiments, settings of the intelligent posting engine 232, or any of its components, may be configured and changed by any users 203A-203N and 205A-205N of the system, and/or machine learning.

The intelligent posting engine 232 may manage communications. Managing communications includes managing rules, which includes implementing the rules (e.g., by retrieving policies stored in sentiment policies 220, analyzing information, and applying the policies to information that includes the analyzed information by performing actions). The intelligent posting engine 232 may manage information associated with the rules, such as by managing data associated with intelligent posting engine 232 or components thereof. Communications may be managed based on information received, by machine learning, and/or one from or more users 203A-203N and 205A-205N, from sentiment policies 220, from memory 244, from intelligent posting engine 232 or any of the other components thereof.

The intelligent posting engine 232 is shown to include a processor 236 and a network interface 240 in addition to memory 244. The processor 236 may correspond to one or many computer processing devices. Non-limiting examples of a processor include a microprocessor, an Integrated Circuit (IC) chip, a General Processing Unit (GPU), a Central Processing Unit (CPU), or the like, as well as the other examples of the processors described herein.

The network interface 240 may be configured to enable the intelligent posting engine 232 to communicate with other machines in the system 200 and/or to communicate with other machines connected with the network 206. The network interface 240 may include, without limitation, a modem, a network card (wireless or wired), an infra-red communication device, etc.

The memory 244 may include one or multiple computer memory devices. The memory 244 may be configured to store program instructions that are executable by the processor 236 and that ultimately provide functionality of the intelligent posting engine 232 described herein. The memory 244 may also be configured to store data or information that is useable or capable of being called by the instructions stored in memory 244. One example of data that may be stored in memory 244 for use by components thereof is one or more data model(s) 256 and/or training data 260. The memory 244 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 244, in some embodiments, corresponds to a computer-readable storage media and while the memory 244 is depicted as being internal to the intelligent posting engine 232, it should be appreciated that the memory 244 may correspond to a memory device, database, or appliance that is external to the intelligent posting engine 232.

Illustratively, the memory 244 is shown to store the intelligent posting engine 232, the sentiment analysis engine 248, the sentinel engine 252, the sentiment policies 220, the data model(s) 256, and/or the training data 260 for execution by the processor 236. In some embodiments, each of the intelligent posting engine 232, the sentiment analysis engine 248, and/or the sentinel engine 252 may correspond to a set of processor-executable instructions (e.g., a finite instruction set with defined inputs, variables, and outputs). In some embodiments, the intelligent posting engine 232, the sentiment analysis engine 248, and/or the sentinel engine 252 may correspond to an AI component of the intelligent posting engine 232 that is executed by the processor 236. Each of the intelligent posting engine 232, the sentiment analysis engine 248, and/or the sentinel engine 252, in some embodiments, may utilize one or more data models 256, which may be in the form of an artificial neural network, for recognizing and processing the information obtained from communication devices 202A-202N and/or 204A-204N and/or supported by the communication server 228. In some embodiments, the intelligent posting engine 232, the sentiment analysis engine 248, and/or the sentinel engine 252 may each be trained with training data 260 and may be programmed to learn from information, including communication information and sentiment information as they occur or after they occur, including and not limited to group communications, conversations related to communications, user management of communications, and reactions to communications. In some embodiments, any one or more of the sentiment analysis engine 248, the sentinel engine 252, and the intelligent posting engine 232 may update one or more of the data models 256 as they learn from ongoing information.

Additional capabilities of the intelligent posting engine 232 will be described in further detail with respect to operation of the sentiment analysis engine 248, and the sentinel engine 252, which are shown to be provided by the intelligent posting engine 232. While certain components are depicted as being included in the intelligent posting engine 232, it should be appreciated that such components may be provided in any other server or set of servers. For instance, components of the intelligent posting engine 232 may be provided in a separate engine (not shown) and/or in the communication server 228, in an engine of the communication server 228, etc., and vice versa. Further still, embodiments of the present disclosure contemplate a single server that is provided with all capabilities of the communication server 228 and the intelligent posting engine 232.

The sentiment analysis engine 248 may be configured to analyze sentiment information together with communication information. The sentiment analysis engine 248 may analyze content to classify the information (e.g., associate one or more sentiments with one or more pieces of content). The sentiment analysis engine 248 may rank content (e.g., via the associated sentiments) and analyze sentiment information such as synonyms and antonyms. The sentiment analysis engine 248 can rank the content based on the sentiments and weight scores, and use the ranking (or any other information) to determine a current sentiment of the communication information (e.g., a current sentiment for each piece of content, a current sentiment for each group). In some embodiments, recent communications may be given more weight in the rankings or a most recent communication may determine the current sentiment of a group. Recent communications may be determined based on any criteria including an amount of time that has passed between communications.

The sentiment analysis engine 248, in various embodiments, includes a machine learning model used to analyze the sentiment information. As discussed herein, the information that the sentiment analysis engine 248 (or any other component of the intelligent posting engine 232, analyzes may be any textual, visual, or audible information, and can include historical information and information as it occurs in real-time. The sentiment analysis engine 248 may provide appropriate signaling to a communication device (e.g., 204A-204N and/or 202A-202N) and/or the communication server 228 that enables the sentiment analysis engine 248 to receive information from the communication device(s) and/or the communication server 228.

The sentinel engine 252 may be configured to continuously fetch sentiment that is detected by the sentiment analysis engine 248. The sentinel engine 252 may fetch determinations of sentiment only, or it may fetch sentiment information that includes other information, such as any associated weight, confidence, and time scores. The sentinel engine 252 may manage current sentiments, including changing the current sentiment when it changes. The sentinel engine 252 may store information associated with the communication information and sentiment information and use the stored information to manage rules, including those based on the policies stored in sentiment policies 220. The sentinel engine 252 can manage communications to and from users 203A-203N and 205A-205N based on the rules.

The sentinel engine 252 may manage other information as well, including scores and timers. The sentinel engine 252 may obtain the other information from various sources, including sentiment policies 220, users 203A-203N and 205A-205N, communication server 228, and other sources. The sentinel engine 252 may manage the starting and stopping of timers that are associated with the rules. In various embodiments, the sentinel engine 252 may set a current sentiment to neutral when a timer expires. The sentinel engine 252 may also consider change factors when managing communications. For example, the sentinel engine 252 can consider a change factor (e.g., that a score must be within a specified difference, such as within a 20 percent value, of another score) when determining whether to change a current sentiment.

As one example, an amount of time may be set based on a time score (e.g., a time score of two hours corresponds to an amount of time of two hours) as a timer when a sentiment is determined for a group or for a piece of content. The sentinel engine may adjust the timer if any new information (e.g., new content having a different sentiment then the current sentiment) is received, such as by stopping the timer, adding time or reducing time from the time, or resetting the timer to a value that corresponds to a newly set current sentiment.

If the new content has an associated change factor, then the change factor can also be considered. For example, if a current sentiment has a weight score associated with it, and a sentiment associated with new content has a weight score associated with it, then a change factor between the weight scores can be considered. Thus, if the change factor is ten percent, then the weight score of the sentiment associated with the new content must be within ten percent of the weight score of the current sentiment in order for the sentiment associated with the new content to replace the current sentiment.

Sentiment policies 220 include policies related to communications and sentiments. The policies may also be referred to herein as rules and may include user settings and preferences. The rules may have any configuration and various types of information associated with them, including actions, scores, thresholds, user preferences, and user settings, for example. The configuration and implementation of rules may be managed by machine learning and/or one or more users 203A-203N and 205A-205N. The management and implementation of rules may be automatic, without user input. Rules may be configured to be personalized for one or more communication devices (e.g., 204A-204N and/or 202A-202N) and/or users (e.g., 203A-203N and 205A-205N). In some embodiments, one or more types of settings may be stored in sentiment policies 220 or in other places in memory 244.

The sentiment policies 220, machine learning, one or more users 203A-203N and 205A-205N, and/or other components of intelligent posting engine 232 may define and manage rules that determine the actions of the intelligent posting engine 232, the sentiment analysis engine 248, and/or the sentinel engine 252. The rules define when and how to send (or not send) communications, and also what other actions (including non-actions) to perform, such as notifying users. The rules may incorporate one or more scores and/or thresholds that interact with the rules or determine implementation of the rules. For example, rules may change based on one or more scores and/or thresholds, and rules may be invoked based on one or more scores and/or thresholds. Rules may define actions and thus, actions may correspond to the rules. The rules may determine timing for when to perform one or more actions (e.g., the rules can define other timing information in addition to the time score) and may determine one or more actions to perform.

Rules may be associated with any desired information, such as a user, a particular group of users, a particular sentiment, a particular weight or confidence score of a sentiment, a particular type of content (e.g., words, images, audio, or video), one or more key words, one or more topics, timing of information (including repetitions of information and timings of communications including comments on social media posts), one or more types of scores, other rules, and any combination of these. For example, if a user wants one of their social media groups to have a different set of rules than another of their social media groups, they may define rules doing so or the machine learning may determine that such rules should be implemented. Rules can include configuring notification settings, such as notifying a user when a post is delayed and/or not posted, as well as providing an option for a user to respond (or allowing a user to take an action based on the notification) regarding whether or not to have new content be forwarded to the group regardless of the results of any sentiment analysis. The rules can be configured to be implemented automatically without human input, including automatically taking actions when conditions of a rule are met.

Rules may be based on a repetition of any content. In various embodiments, rules may be based on one or more key words, including a detection of a specified number of repetitive words occurring within content, locations of key word(s) within information, a detection of a specified number of repetitive words occurring over a specified timeframe, etc. The rules may be predetermined (e.g., automatically applied by the intelligent posting engine 232 and/or set or changed based on various criteria). The rules are configurable for any timing or in real-time. For example, managing communication information, sentiment information, and actions, may occur at any timing or continuously in real-time.

Thresholds may be used in the configuration of rules. Some settings configured by a user can cause rules to be implemented (and, if applicable, notifications to be displayed) at one or more communication devices (e.g., 204A-204N and/or 202A-202N) when a threshold is met or exceeded. Various thresholds may be set for any user (e.g., 203A-203N and 205A-205N) and/or any communication device (e.g., 204A-204N and/or 202A-202N). In addition, intelligent posting engine 232 may automatically configure one or more thresholds and associated rules. Regardless of how rules and thresholds were initially configured, they may change based on machine learning or from input by a user changing them.

For example, thresholds may correspond to one or more specified sentiments having a weight score and/or a confidence score that exceed a certain threshold (e.g., a first threshold may be set that configures an action to occur for any negative sentiment that has a weight score of over 60 percent with a confidence score of at least 80 percent, and a second threshold may be set that configures a different action to occur for any negative sentiment that has a weight score of over 90 percent with a confidence score of at least 80 percent).

The thresholds may also be related to time scores or other information. In some embodiments, a first threshold may set a first time associated with a rule for any negative sentiment that has a weight of over 80 percent, and a second threshold may set a second time associated with the rule for any negative sentiment that has a weight of over 90 percent. In addition, specific thresholds may be related to the timing of one or more sentiments. For example, if one or more sentiments related to a specified basic sentiment occur greater than three times within fifteen minutes (e.g., having a threshold of three occurrences within a set timeframe of fifteen minutes), then a specified action may occur, such as setting the basic sentiment as a current sentiment for the group in which the associated content was posted and also setting a timer to expire in two hours. The rule can further reset the current sentiment to neutral after the two hours expires if another post having a sentiment relating to the basic sentiment has not been received and any other post requiring a change to the current sentiment has not been received, resetting the timer if a post having a sentiment related to the basic sentiment is received during the two hours, or updating the current sentiment if necessary as required by other rules. In addition, the rule can determine that if one or more sentiments related to the specified basic sentiment occur greater than eight times within fifteen minutes (e.g., having a threshold of eight occurrences within a set timeframe), then a different specified action may occur, such as setting the sentiment as a current sentiment for the group in which the associated content was posted and setting a timer to expire in one day.

Thresholds may also be related to scores. For example, thresholds may be related to a weight score that is based on an intensity of a type of sentiment. For example, sadness and grief may be classified as synonymous sentiments. However, a sad sentiment may have a lesser weight than a grief sentiment; thus, if a sad sentiment is identified, then a lesser weight may be assigned to the sad sentiment than would be assigned to a grief sentiment. A threshold may be set regarding an amount time to maintain a rule related to the sad sentiment (e.g., if another post is identified as having a sentiment synonymous with sadness, then a specified amount of time to extend the rule may be added). If the sentiment of new content is in consonance with a current sentiment, then embodiments described herein may allow the new content to be posted.

Rules can be customized based on any criteria, e.g., one or more rules may be specific to any user, device, or groups of users or devices. For example, users 203A-203N and 205A-205N may each have profile settings that configure one or more of their rules, thresholds, scores, policies, preferred configurations of notifications, etc., among other user preferences. Settings chosen by an administrator or a certain user may override other settings that have been set by other users 203A-203N and 205A-205N, or settings that are set by default. Alternatively, settings chosen by a user may be altered or ignored based on any criteria at any point in the process. For example, settings may be created or altered based on a user's association with a membership or a group, based on a location or time of day, or based on a user's identity or association with an entity, among others.

Groups may be pre-defined by one or more users or by machine learning. In various embodiments, groups may have a type and the type may be a property of the group. Types of groups can include friends, close friends, school friends, school acquaintances, professional organizations, neighbors, family, and office colleagues, among others. Each type of group may have properties that are customized for the specific type of group. In some embodiments, a group may be identified by machine learning. For example, the historical data of the group may be analyzed by machine learning (e.g., by using natural language processing and/or machine learning to analyze the historical data in the group, to determine what kind of messages get posted, and to assign a type to the group based on the analysis of the historical data).

Groups may have properties that define policies. In some embodiments, one or more types of groups can inherently have properties where only some types of messages are allowed to be posted in those groups (e.g., a group with family members including elderly members of family may not allow posts containing inappropriate jokes and a user trying to publish such a post can be notified). In various embodiments, a user may be given an option in the notification or following the notification to continue to post the dis-allowed post; however, even if the user selects to post the message, the system can again warn the user with a notification that the post is inappropriate for the group. In some embodiments, the user may still be able to proceed with posting the post.

As can be appreciated by one skilled in the art, functions offered by the elements depicted herein may be implemented in one or more network devices (i.e., servers, networked user device, non-networked user device, etc.).

In various embodiments, the types of groups may similarly apply to types of new content. Thus, the sentiment analysis can classify any new content, pieces of new content, and/or multiple new contents as having one or more "types." Types of content can include classifications related to friends, close friends, school friends, school acquaintances, professional organizations, neighbors, family, and office colleagues, among others. For example, a type of content can have properties classifying it as appropriate for close friends. Or, a type of content can have properties classifying it as being inappropriate for friends, school friends, school acquaintances, professional organizations, neighbors, family, and office colleagues, In either of these scenarios, policies in various embodiments can manage the content so that a user can post the content to a group that is a close friends group, but the user will receive a notification if the user tries to post the content to any of the friends, school friends, school acquaintances, professional organizations, neighbors, family, and office colleagues groups. In addition to, or instead of, the notification, the content may be stopped from posting to any of the friends, school friends, school acquaintances, professional organizations, neighbors, family, and office colleagues groups.

Each type of content may have properties that are customized for the specific type of content. In some embodiments, a type of content may be identified by machine learning. For example, data related to the content may be analyzed by machine learning (e.g., by using natural language processing and/or machine learning to analyze words, phrases, and/or images or portions of images in the content), to determine what kind of content gets posted, how the content is reacted to by users, and to assign a type to the content based on the analysis.

In some embodiments, a group may have a property of being a family group and the group may include an entire age range of members (including elderly members of a family as well as some children). When someone (a member of the group or someone else) tries to post new content to the group that is adult content (e.g., an adult joke, an adult message, an adult picture, an adult image, and/or an adult audio/video file that is inappropriate for children and perhaps distasteful to one or more of the adults), the new content may be determined by the sentiment analysis to have adult content. Thus, the new content may have a property that is adult content, or a classification as being adult content. There may be one or more rules in the sentiment policies 220 regarding types of groups and/or types of content, and these rules may include a rule to not post any adult content to a family group. Therefore, groups and content as well as types of groups and/or types of content may be managed by the methods and systems described herein based on a type of group and/or content, in addition to (or instead of), being managed based on sentiment data.

Figure 3:
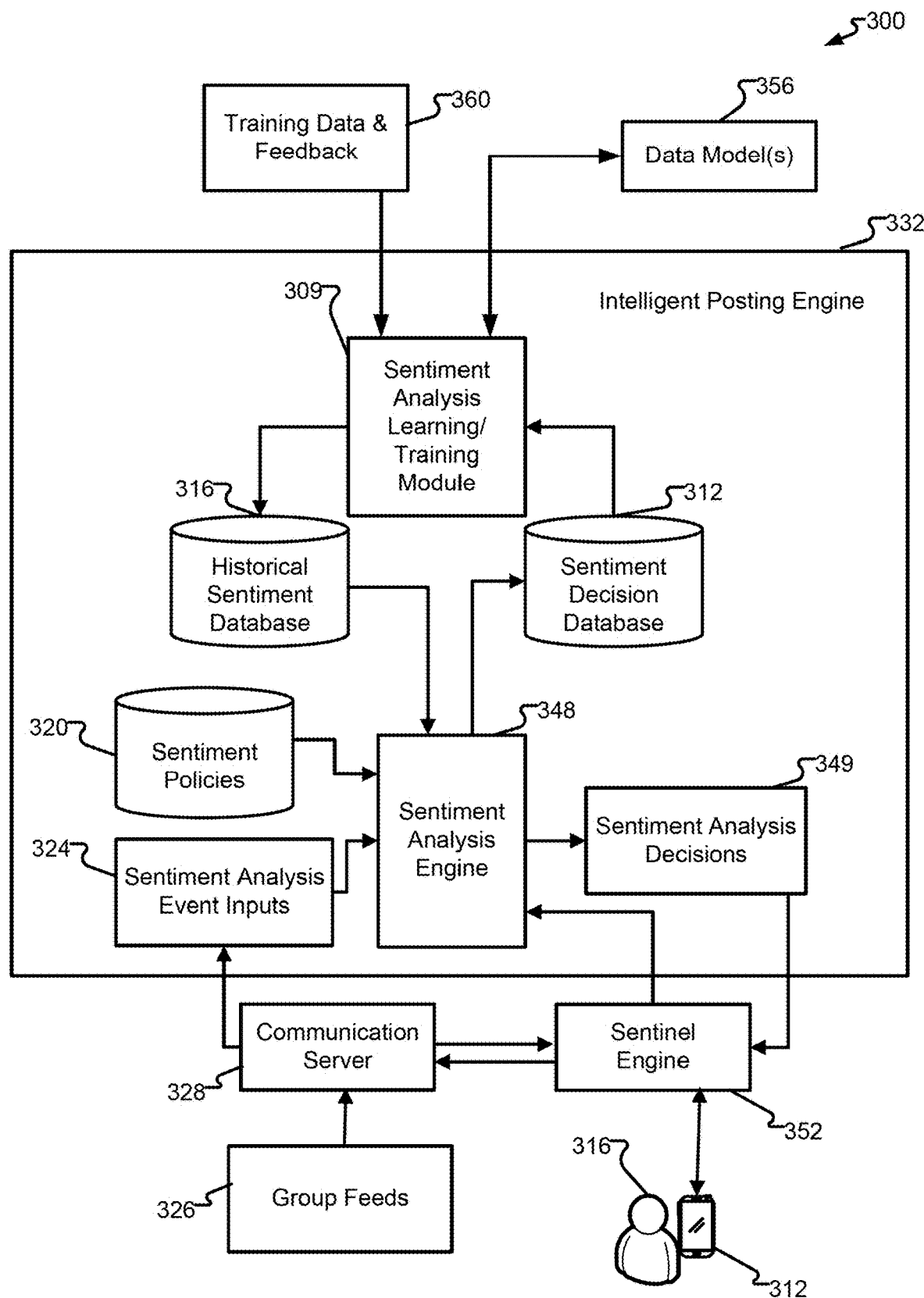
FIG. 3 is a block diagram illustrating a third system in accordance with at least some embodiments of the present disclosure.

Further details of an intelligent posting engine 232 utilizing machine learning are described with reference to FIG. 3. In some aspects, the components shown in FIG. 3 may correspond to like components shown in FIGS. 1 and 2. FIG. 3 shows a system 300 including an intelligent posting engine 332 together with a communication server 328 and a sentinel engine 352, and associated components. As explained herein, in some embodiments, various components of system 300 may be combined or not present in system 300; for example, there may be only one engine that handles all of the components and functionality for the communications and sentiment analysis.

In various embodiments, the intelligent posting engine 332 may correspond to the intelligent posting engine 232 of FIG. 2. The intelligent posting engine 332 can create and select appropriate processing decisions. Processing decisions includes managing communication information and sentiment information, including scores and thresholds. Managing data can also include performing or not performing actions (e.g. sending or not sending communications and sending notifications). Processing decisions and actions may be handled automatically by the intelligent posting engine 332 or other components without human input. The intelligent posting engine 332 may manage communications based on input from any source, including users 203A-203N and 205A-205N, sentiment policies 320, sentinel engine 352, historical sentiment database 316, and based on communication information inputs received from the communication server 328.

Components of system 300 may have access to training data and feedback 360. For example, the training data and feedback 360 can initially train behaviors of the sentiment analysis engine 348 to utilize machine learning when the sentiment analysis learning/training module 309 receives data from training data and feedback 360. The sentiment analysis engine 348 may be configured to learn from further information based on feedback, which may be provided in an automated fashion (e.g., via a recursive learning neural network) and/or a human-provided fashion (e.g., by one or more human users 205A-205N and/or 203A-203N). The feedback may relate to sentiment analysis, communication rules, and policies, among other information.

To enhance capabilities of the intelligent posting engine 332, the intelligent posting engine 332 may constantly be provided with updated training data 360. The training data may be communication inputs in the form of communication information, including real-time communication data from users 203A-203N and 205A-205N. The training data 360 can include key words, key phrases, text strings, topics, information about audio content, and information about images that are associated with communication information and/or sentiment information. It is possible to train the intelligent posting engine 332 and components thereof to have a particular output or multiple outputs.

The sentiment analysis learning/training module 309 of the intelligent posting engine 332 may have access to and use data model(s) 356. For example, one or more models in data model(s) 356 may be built and updated by the sentiment analysis training/learning module 309 based on the training data and feedback 360. The data model(s) 356 may be provided in any number of formats or forms. Non-limiting examples of a data model 356 includes Decision Trees, SVMs, Nearest Neighbor, and/or Bayesian classifiers. Past historical labelled data may be used to train the models by using predefined tags (e.g., positive, neutral, and negative) to tag content manually (e.g., by identifying key words, key phrases, text strings, images, properties of sounds including voices, etc. as a topic and tagging the topic with relevant sentiment information). The models can be trained to recognize and classify sentiment information by analyzing communication information. For example, a model may be trained to assign different weights to different emotions (e.g. grief, can be assigned a very high weight while sadness can be assigned a medium weight). The models can be tuned to account for different preferences (e.g., requirements) of users as the models receive data. Tuning the models is advantageous because the needs or preferences of one entity may be different from another entity, and also different from the needs of individual users.

The learning/training module 309 may also be configured to access information from sentiment decision database 312 for purposes of building the historical database 316, which effectively stores historical information. Sentiment decision database 312 stores data resulting from sentiment analysis. Data within the historical database 316 may be continuously managed by the learning/training module 309 as the intelligent posting engine 332 processes additional information received from communication server 328. Information stored in historical sentiment database 316 may include and is not limited to historical sentiment information, historical analysis, historical communication information. Historical information regarding rankings, scores, and/or importance of different content and/or sentiments, may be stored in historical sentiment database 316 for use by intelligent posting engine 332.

The communication server 328 receives inputs from users (e.g., users 203A-203N via communication devices 202A-202N) and from the group feeds 326. In some embodiments, one or more users 203A-203N may be members of one or more groups in the group feeds 326. In addition, user 316 may be one of the users 203A-203N and/or may be a member of one or more groups in the group feeds 326. The communication server 328 can provide information including communication information, sentiment information, and other information, to the sentiment analysis event inputs 324 and the sentinel engine 352. In various embodiments, the intelligent posting engine 332 and/or the sentiment analysis engine 348, as well as the sentinel engine 352 may be responsible for processing and managing the information received from the communication server 328.

The communications server 328 may also obtain communications information from device 312 via sentinel engine 352. The communication server 228 may be configured to obtain and provide relevant communication information to any of the intelligent posting engine 232, the sentiment analysis engine 248, and/or the sentinel engine 252, thereby facilitating the intelligent posting engine's 232 ability to implement the methods and systems disclosed herein.

In some embodiments, the intelligent posting engine 332 may include multiple engines, such as the sentinel engine 352 and the sentiment analysis engine 348. In system 300, the sentiment analysis engine 348 has access to the historical sentiment database 316, the sentiment decision database 312, the sentiment policies 320, the sentiment analysis event inputs 324, the sentinel engine 352, and the sentiment analysis decisions 349.

The sentiment analysis engine 348 may provide appropriate signaling to the communication server 328 that enables the sentiment analysis engine 348 to receive communication information from the communication server 328 via the sentiment analysis event inputs 324. Further, in various embodiments, if data from the communication devices (e.g., 204A-204N and/or 202A-202N) is not provided via the communication server 328 and/or the sentinel engine 352, the sentiment analysis engine 348 may provide appropriate signaling to one or more of the communication devices (e.g., 204A-204N and/or 202A-202N) that enables the sentiment analysis engine 348 to receive communication information from the communication device(s) (e.g., 204A-204N and/or 202A-202N).

The sentiment analysis engine 348 may analyze and manage communication and sentiment information based on input received from historical sentiment database 316, sentiment policies 320, sentiment analysis event inputs 324, and sentinel engine 352. The sentiment analysis engine 348 can provide decisions to sentiment analysis decisions 349 and sentiment decision database 312. In various embodiments, instead of providing data to the communications server 328 via the sentinel engine 352, the sentiment analysis engine 348 may provide decisions directly to the communication server 328.

The sentiment analysis event inputs 324 may include information about sentiment and communication information handled by the communication server 328. For example, the communication information may include content related to social media posts, sentiment information related to the content, and group information. Thus, for example, the communication server 328 may receive information from social media sources that includes details regarding updates to content in the social media sources.

The sentinel engine 352 may manage communications based on input from sentiment analysis decisions 349 and communication server 328, and provide input to the sentiment analysis engine 348. The sentinel engine 352 may provide appropriate signaling to the communication server 328 that enables the sentinel engine 352 to receive communication information from the communication server 328, and may also provide appropriate signaling to the communication device 312 that enables the sentinel engine 352 to receive communication information directly from the communication device 312.

The communication server can receive input not only from users (e.g., users 203A-203N via communication devices 202A-202N), but also from the group feeds 326. The group feeds 326 is content with communication information shared among multiple users. The content of group feeds 326 may be hosted on a server and may be managed by any type of entity. The group feeds can include content from any types of groups, including social media groups (also referred to as sources), customer support groups, conversational groups (e.g., for specific customers or communities), and forums (e.g., customer review forums). Group information may be obtained using web scraping tools or APIs.

For example, the sentinel engine 352 may receive a new post sent from user 316 via device 312 to be posted in a social media group to which the user 316 belongs. Before, during, or after the new post is received by the sentinel engine 351, the sentiment analysis engine 348 performs sentiment analysis on communications from group feeds 326, one of which is a feed of the social media group to which the user 316 belongs. More specifically, the sentiment analysis engine 348 receives the group feeds 326 as communications from the communication server 328 via the sentiment analysis event inputs 324. The sentiment analysis event inputs determines which communications (and what information associated with the communications) to provide to the sentiment analysis engine 348 based on sentiment policies 320 provided by the sentiment analysis engine 348.

Upon receiving the content of the communications, the sentiment analysis engine 348 analyzes each piece of content for relevant content, for example, using text recognition, voice-to-text processing, image processing, key word identification, etc. The sentiment analysis engine 348 performs sentiment analysis by determining one or more sentiments that are associated with the content (e.g., by recognizing words or other content that are associated with certain sentiments, saving an association of the sentiment with the words or other content, and determining any additional information such as timing, scores, and other properties). The sentiment analysis engine 348 may also determine any synonyms and antonyms for the sentiments that are associated with the content (e.g., any synonyms and antonyms for the identified sentiments and/or any synonyms and antonyms for pieces of content). In some embodiments, the sentiment analysis engine 348 may determine scores associated with the sentiments and their associated content, including assigning weight scores based on a type of sentiment, assigning time scores based on each weight score, and assigning a confidence score for how likely it is that the sentiment is accurate based on the sentiment analysis.

Based on the analysis, the sentiment analysis engine 348 ranks (e.g., based on weight scores and/or confidence scores), if necessary, the sentiments and determines a current sentiment (e.g., the sentiment corresponding to the highest ranking) for the new post and for the social media group to which the user 316 belongs. Any other type of processing may be used on the sentiment information other than ranking, such as identifying a most commonly occurring sentiment. The sentiment analysis engine 348 may consider change factors when determining current sentiments. The sentiment analysis engine 348 may perform this analysis on a continuous basis, so that every time new content is received for the social media group to which the user 316 belongs, the sentiment analysis engine 348 analyzes the new content to determine whether the current sentiment (or other information, such as a timer, etc.) for the group needs to be updated, and then provides sentiment data, including the current sentiment of the new post and the current sentiment of the social media group to which the user 316 belongs, to the sentiment analysis decisions 349. The sentinel engine 352 can fetches data from the sentiment analysis decisions 349.

As one example, the new post may have a text portion of content, an audio portion of content, and an image together within the post. The sentiment analysis can determine portions of the text portion to analyze (e.g. based on text recognition including key word recognition and phrase recognition) and associate sentiments with each of the portions of content. The sentiment analysis can similarly analyze the audio portion (or portions of the audio portion) and the image (or portions of the image) to associate any one or more sentiments with the respective portions of content. If there are multiple sentiments associated with the new post, the multiple sentiments may be ranked by sentiment information and/or other information, or otherwise processed, to determine a current sentiment of the new post.

Using the current sentiment of the new post and the current sentiment of the social media group to which the user 316 belongs, the sentinel engine 352 compares the current sentiment of the new post and the current sentiment of the social media group to which the user 316 belongs in order to determine whether to allow or deny the new post being sent to the social media group to which the user 316 belongs. The sentinel engine 352 also can manage any timers associated with the current sentiments and consider change factors when comparing the current sentiments. If the sentinel engine 352 determines that the new post is to be sent to the social media group to which the user 316 belongs, then the sentinel engine 352 sends the new post to social media group via the communication server 328, where the new post is posted in the appropriate social media group in the group feeds 326. If the sentinel engine 352 determines that the new post is not to be sent to the social media group to which the user 316 belongs, then the sentinel engine 352 performs any actions necessary as determined by the intelligent posting engine 332. For example, the sentinel engine 352 may hold the new post until a timer associated with the social media group to which the user 316 belongs expires. Alternatively, the sentinel engine 352 may delete the new post or save the new post for sending or retrieving at a later time. In any event, the sentinel engine 352 can send a notification (e.g., a warning) to the user 316 about a status of the new post. The sentinel engine 352 can configure the notification in any manner (such as by including a time that the new post will be sent to the group, a reason why the new post was not sent, a time at which the current sentiment of the group will expire, etc.), and may determine content of the notification based on user preferences or settings, such as a privacy policy. The sentinel engine 352 can receive an input from the user after the notification has been sent that directs the sentinel engine 352 to send the new post to the group regardless of any results of the sentiment analysis.

The sentiment information may be managed using any criteria. For example, in some embodiments, if a current sentiment of a new post is synonymous with a current sentiment of a group, then the new post may be immediately sent to the group. If the current sentiment of a new post is opposite from a current sentiment of a group, then the new post may be not sent to the group and a user sending the new post may be notified. In additional embodiments, scores and/or change factors may be considered together with synonym and antonym information when managing a new post (e.g., a change factor and/or one or more scores may be considered when a sentiment is considered to be synonymous with another sentiment).

In some aspects, one or more scores may be used to determine if a sentiment of new content is posted regardless of how it is related to a current sentiment of a group. For example, even if a sentiment of new content is opposite to a current sentiment of a group, the sentiment of the new content can override the current sentiment based on various properties, such as the sentiment, the intensity of an emotion, etc. In some embodiments, some sentiments like grief, anguish, and sadness in some scenarios do carry more weight than a happy sentiment, considering human nature. As an example, if there is a current sentiment of happy within a group, and a user sends a new post to be posted that has a negative sentiment because a group member has had an unfortunate circumstance (e.g., a serious accident, a need for emergency help, or someone's demise), then the new post may override the sentiment of happiness for the group and be posted to the group regardless of a relationship between the current sentiment of the group and the sentiment of the new post.

Other rules for different sentiments are possible. For example, in various embodiments, a current sentiment of a group may be grief (e.g., due to a demise of a member); however, a member of the group is trying to post a new content with a happy or joyful sentiment (e.g., a joke having a happy sentiment, or the high score on results of an exam). In such a scenario, although these are happy sentiments, they are opposite to the current sentiment of the group, and the happy sentiments can carry a lower weight than the current sentiment of grief (at least until a certain time expires when the group sentiment is set back to neutral, after which the happy sentiment can be allowed). In this scenario, a user can be sent a notification and warning to not post the message; however, the user can override the warning and still decide to post the message to the group.

Figure 4:
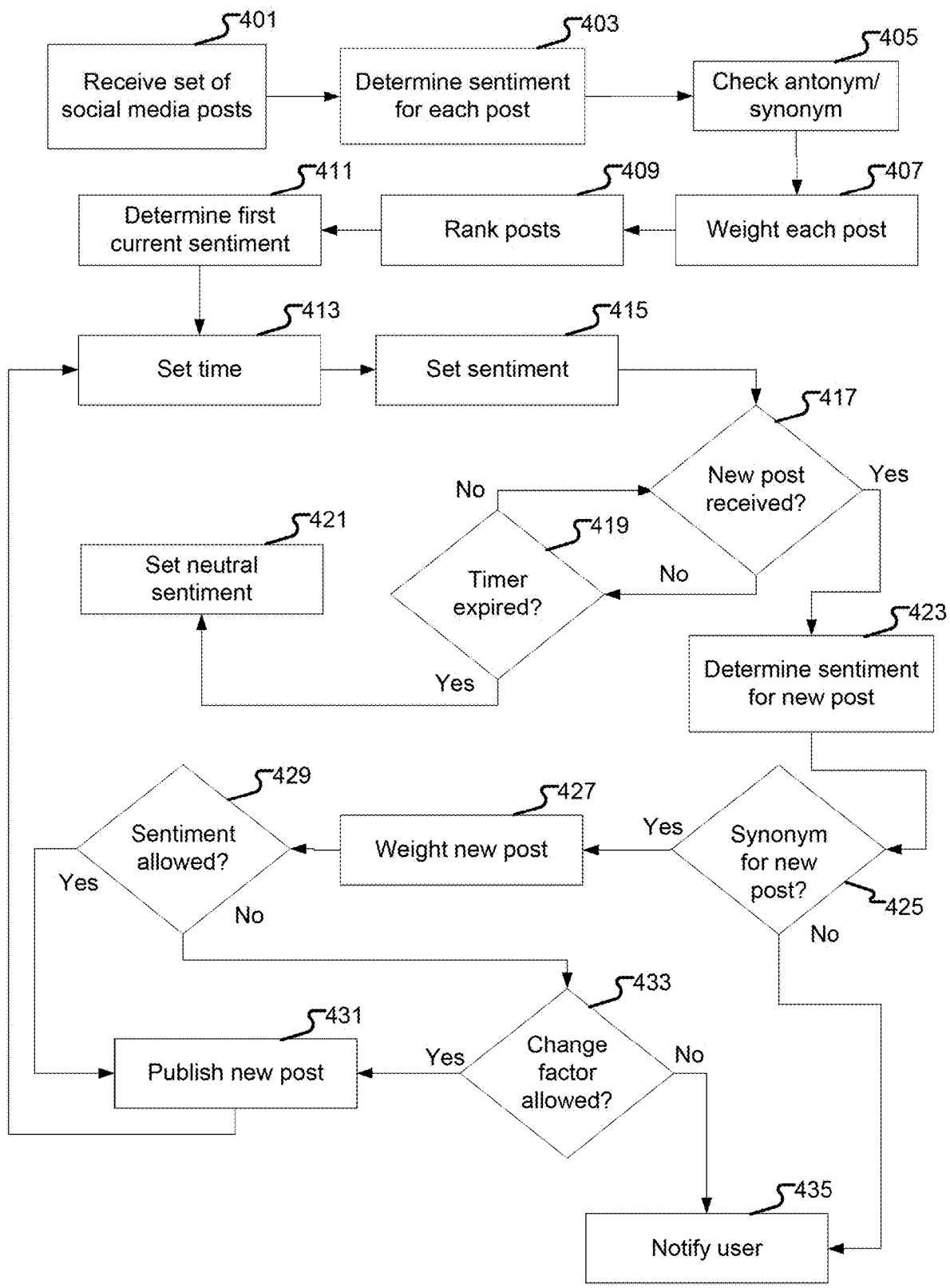
FIG. 4 is a flow diagram depicting a first method in accordance with at least some embodiments of the present disclosure.

FIG. 4 is a flow diagram depicting a first method in accordance with at least some embodiments of the present disclosure. At step 401, a set of social media posts from a social media group is received. The set of social media posts may be received in accordance with continued, real-time monitoring of the social media by the intelligent posting engine 332. In some embodiments, set of social media posts may be received when a user requests to fetch the current sentiment of one or more groups. For example, the user may use an API to request a current sentiment of one or more groups.

The sentiment for each post is determined at step 403. In various embodiments, the sentiment may be determined by the sentiment analysis engine 348, by another component of the intelligent posting engine 332, or by the sentinel engine 352. The sentiment may be determined using an aspect based sentiment analysis. The system may analyze each post for relevant content, or pieces of content, and identify a sentiment to associate with the content or each piece of content. When performing the sentiment analysis, the sentiments are checked for synonyms and antonyms at step 405. If a synonym and/or antonym is identified, these may be associated with the sentiment, which is also associated with the content or piece of content of each social media post.

At step 407, a weight score is determined for each post. The weight score may be a score that is associated with, and determined by, each sentiment and may correspond to an intensity of the sentiment. Using the weight scores and any other associated sentiment or communication information (e.g., synonym and antonym information and timing information of each of the social media posts), the posts are ranked at step 409. The posts may be ranked by determining a basic sentiment that occurs most frequently within the posts, ranking the posts that are associated with the basic sentiment by the weight scores associated with their sentiment, and then choosing the sentiment having the highest weight score. Using the results of the ranking, the first current sentiment is determined at step 411.

A time associated with the first current sentiment is set at step 413. The time may be an amount of time associated with a time score that corresponds to the weight score of the current sentiment. The time may be sent for any time, may be related to any one or more pieces of information, and may have any relationship with other information (e.g., an amount of time associated with the time score may correspond to a value of the weight score). The first current sentiment is set for the social media group at step 415. The first current sentiment may be set by the sentinel engine 352 after the sentinel engine receives the first current sentiment from the sentiment analysis engine 348. In various embodiments, the first current sentiment, together with any other communication information or sentiment information, may be provided to a user requesting the information (e.g., via a REST API).

After setting the first current sentiment, the system is monitored (e.g., by the sentinel engine 352) for a new post at step 417. If a new post is not received then the system determines whether the timer has expired at step 419. If the timer has not expired, the method returns to (or remain at) step 417 to continue monitoring for any new post received at the social media group. If the timer has expired at step 419, then a neutral sentiment may be set at step 421 by the sentinel engine 352.

When a new post for the social media group is received, then a sentiment of the new post is determined at step 423 in accordance with embodiments disclosed herein. Using the sentiment of the new post, the sentiment analysis engine 348 can compare the sentiment of the new post to the first current sentiment at step 425 to determine if they are synonymous. If the post is not synonymous, the user who attempted to post the new post may be notified at step 435. The notification can have any configuration.

If the sentiment of the new post is synonymous with the first current sentiment at step 425, then a weight associated with the sentiment of the new post is determined at step 427 and the system determines whether the sentiment of the new post is allowed at step 429. The sentiment analysis engine 348 can determine if the sentiment of the new post is allowed in the social media group by comparing the sentiment of the new post with rules from the sentiment policies 320 as they apply to the current sentiment of the social media group. For example, if the sentiment of the new post is synonymous with the current sentiment of the social media group, then the new post may be sent to be published to the social media group at step 431.

In some embodiments, the weight associated with a piece of content (e.g., associated with a sentiment of content and/or a group) may determine an action. For example, a weight score associated with the post at step 423 may determine the action that, no matter how the sentiment of the post is related to the first current sentiment of step 415, the post is posted in the social media group. When the post is published in the social media group, the sentiment of the post may become the first current sentiment.

If the sentiment of the new post is allowed, and the new post is published to the social media group, the method may proceed back to step 413 to set a time for the sentiment of the new post and also set the sentiment to be the sentiment of the new post at step 415, as well as continue with the process as shown in FIG. 4.

Returning to step 429, the sentiment of the new post may not be allowed to be posted in the social media group. For example, if the sentiment of the new post is not synonymous with the current sentiment of the social media group; however, the sentiment of the new post is not an antonym of the current sentiment of the social media group, then the method may determine an allowable change factor at step 433. The change factor may be a factor of thirty, so that a weight difference between a weight score of the sentiment of the new post and a weight score of the current sentiment of the social media group must be within thirty percent of each other in order for the new post to be sent to the social media group. The sentiment change factor and its associated rules may be obtained from the sentiment analysis engine 348 from the sentiment policies 320, for example.

If the analysis based on the change factor determines that the new post is allowed, then the new post may be published to the social media group at step 431. When the new post is published, the method may proceed back to step 413 to set a time for the social media group, where the time is associated with the sentiment of the new post, and also set the sentiment of the social media group to be the sentiment of the new post at step 415. If the change factor is not allowed at step 433, then the user is notified at step 435. The notification to the user may have any configuration. For example, the notification can display a statement to the user that the new post is not going to be sent to the social media group and provide a reason why. Also, the notification can provide further details regarding the sentiment information of the social media group and the new post, and any timing information associated therewith.

Figure 5:
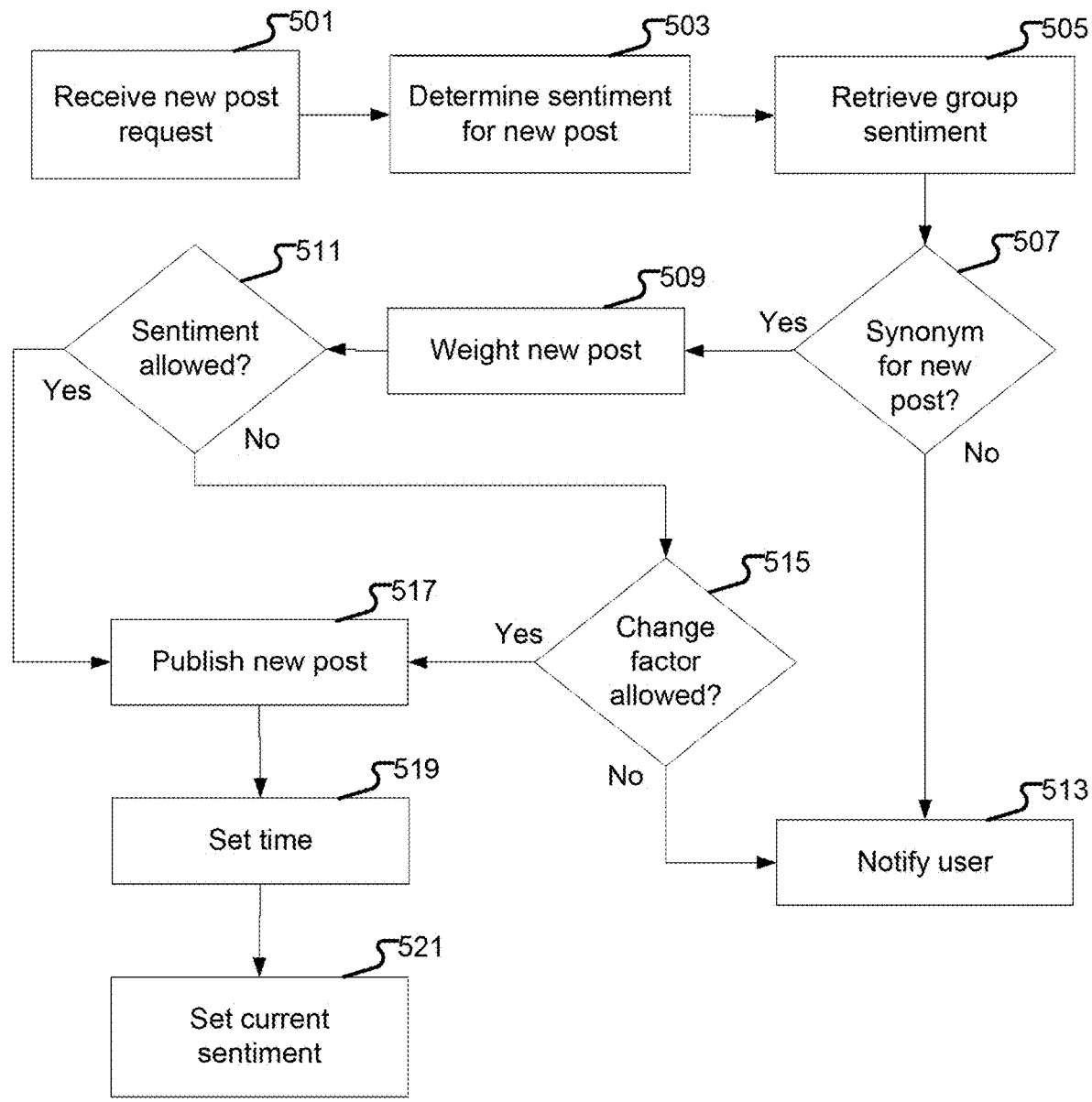
FIG. 5 is a flow diagram depicting a second method in accordance with at least some embodiments of the present disclosure.

FIG. 5 is a flow diagram depicting a second method in accordance with at least some embodiments of the present disclosure. In FIG. 5, at step 501, a request for a new post is received. The request may be from a business that wants to post advertising content to a neighborhood messaging group. The request may be received by sentinel engine 352, which begins the sentiment analysis on the new post by sending the new post to the sentiment analysis engine 348 for processing. The sentiment is determined for the new post at step 503.

At step 505, the group sentiment for the neighborhood messaging group is retrieved. The group sentiment may have been determined previously by the sentiment analysis engine 348 from previous messages in the neighborhood messaging group. The sentiment analysis engine 348 saves the group sentiment to the sentiment analysis decisions 349. The group sentiment is then retrieved by the sentinel engine 352 from the sentiment analysis decisions 349.

At step 507, the sentiment of the new post is compared to the sentiment of the group to determine if they are synonymous. In various embodiments, the sentinel engine 352 may compare the sentiments based on classifications described in Plutchik's Wheel of Emotions to determine how the sentiment of the new post relates to the sentiment of the neighborhood messaging group.

If the new post sentiment is synonymous with the group sentiment, the new post can have a weight score determined at step 509. For example, the weight score may have been associated with the sentiment by the sentiment analysis engine 348 at the time that the sentiment analysis was performed. The weight score may then be retrieved by the sentinel engine 352. Alternatively, the sentinel engine 352 may request that the sentiment analysis engine 348 determines the weight score at any time when the sentinel engine 352 performs the comparison. If the new post sentiment is not synonymous with (or is an antonym to) the group sentiment, the user is notified at step 513.

Returning to step 511, the method determines if the sentiment of the new post is allowed. This determination may be done based on rules regarding the type and weight score of the sentiment. If the sentiment of the new post (also considering the weight score of the new post, if necessary) is allowed, then the method publishes the new post at step 517. If the sentiment of the new post (also considering the weight of the new post, if necessary) is not allowed, then the method can continue on to determining if a change factor is allowed at step 515.

At step 515, a weight difference between a weight score of the sentiment of the new post and a weight score of the current sentiment of the neighborhood messaging group is compared to determine if the new post is allowed to be published to the neighborhood messaging group. If the change factor is not allowed at step 515, then the user is notified at step 513. If the change factor is allowed at step 515, then the new post is published at step 517.

The sentiment analyses described herein is advantageous for users. For example, if there is a message in the group about sad news, then the methods and systems described herein would prevent a user would prevent a user from posting a joke in the group if the sentiment of the group is sad. As another example, if a group member has bought a new car, and there is admiration for that person in the group and someone tries to post a caustic joke, the methods and systems disclosed herein may warn the poster. Further, if there is content in a group about a person having met with an accident and the overall sentiment in the group is of grief, if someone is trying to post a sarcastic joke, the methods and systems disclosed herein can warn the user, for example by providing a message such as: "This post may not be liked by the group members, and can be hurtful. It is recommended that you do not post this on the group."

In addition, users can advantageously gain meaningful insights about what content to post and when. Embodiments can help users, including businesses, create improved reputations and greater likeability, which may help gain support, such as a greater number of followers, a greater number of customers, a greater number of associates, etc. This can be financially advantageous as well. For example, customers may be willing to spend more money with, and be more loyal to, a company that delivers an excellent service and is sensitive to the concerns and feelings of its customers.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing communications, the method comprising:
receiving a group communication from a group;
determining, based on the group communication, a group sentiment;
receiving a communication with a request to send the communication to the group;
determining, based on the communication, a communication sentiment;
comparing the group sentiment with the communication sentiment; and
based on the comparison of the group sentiment with the communication sentiment, performing an action on the request to send the communication,
wherein the action comprises sending a notification to a sender of the communication and
wherein the notification comprises a result of the comparison of the group sentiment with the communication sentiment, a recommendation to not send the communication to the group and an option for the sender to override the recommendation and send the communication to the group before a timer that indicates how long the group sentiment will prevail in the group expires.

2. The method of claim 1, wherein if the comparison of the group sentiment with the communication sentiment finds an agreement between the group sentiment and the communication sentiment, then the action comprises forwarding the communication to the group, and wherein if the comparison of the group sentiment with the communication sentiment finds a disagreement between the group sentiment and the communication sentiment, then the action comprises not forwarding the communication to the group and notifying a sender of the communication.

3. The method of claim 1, wherein the group sentiment comprises a type of sentiment and a weight score.

4. The method of claim 3, further comprising:
setting a current sentiment of the group based on the determining the group sentiment; and
setting the timer for the current sentiment in the group, wherein an amount of the timer is based on the weight score.

5. The method of claim 1, wherein, before the determining the group sentiment, the group has a current sentiment, and wherein the determining the group sentiment further comprises:
receiving a new group communication in the group;
determining a sentiment of the new group communication; and
comparing the current sentiment to the sentiment of the new group communication to determine the group sentiment.

6. The method of claim 1, wherein the group sentiment comprises a weight score, wherein the comparison of the group sentiment with the communication sentiment finds a disagreement between the communication sentiment and the group sentiment, and wherein the action is to forward the communication to the group based on the weight score.

7. The method of claim 1, further comprising:
determining a confidence score for the communication sentiment;
determining a weight score for the communication sentiment; and
determining a time score for the communication sentiment, wherein the time score is based on the weight score.

8. The method of claim 7, wherein the comparison of the group sentiment with the communication sentiment determines that the communication sentiment disagrees with the group sentiment, and if the weight score is above a threshold, then the action comprises posting the communication to the group.

9. The method of claim 1, further comprising:
determining a weight score for the communication sentiment; and
comparing the weight score to a threshold before the performing the action.

10. The method of claim 1, wherein the group is a social media group, wherein the social media group has members of the social media group, and wherein a sender of the request to send the communication is a member of the members.

11. The method of claim 1, wherein a text string is associated with the communication and an image is associated with the communication, and wherein the determining the communication sentiment comprises a first sentiment analysis of the text string and a second sentiment analysis of the image.

12. The method of claim 9, wherein at least one of the determining the group sentiment and the determining the communication sentiment comprises an aspect based sentiment analysis.

13. The method of claim 1, further comprising:
storing a property of the group communication in a database of sentiment decisions;
enabling a machine learning process to analyze the database of sentiment decisions; and
updating a data model to automatically perform, based on an analysis performed by the machine learning process, an analysis of sentiment properties comprising the property of the communication.

14. A communication system, comprising:
a processor; and
a computer memory storing data thereon that enables the processor to:
receive a group communication from a group;
determine, based on the group communication, a type of group for the group, wherein the type of group comprises a policy;
receive a communication with a request to post the communication to the group;
determine, based on the communication, a communication sentiment;
compare the policy with the communication sentiment; and
based on the comparison of the policy with the communication sentiment, perform an action on the request to post the communication,
wherein the action comprises sending a notification to a sender of the communication, and
wherein the notification comprises a result of the comparison of the policy with the communication sentiment, a recommendation to not send the communication to the group, and an option for the sender to override the recommendation and send the communication to the group before a timer that indicates how long the policy will prevail in the group expires.

15. The communication system of claim 14, wherein the policy comprises a rule about a basic sentiment, wherein the communication sentiment has a relationship to the basic sentiment, and wherein the action is determined by the rule and the relationship.

16. The communication system of claim 14, wherein the type of group of the group is determined by a machine learning process.

17. The communication system of claim 14, wherein the determining the communication sentiment comprises an aspect based sentiment analysis using a machine learning process.

18. A system, comprising:
a microprocessor and a computer-readable medium coupled thereto, wherein the microprocessor receives and executes instructions from the computer-readable medium and wherein the instructions cause the microprocessor to:
receive a group communication from a group;
determine, based on the group communication, a group type;
receive a communication with a request to post the communication to the group;
determine, based on the communication, a communication type;
compare the group type with the communication type of the communication of the request; and
based on the comparison of the group type with the communication type, perform an action on the request to post the communication,
wherein the action comprises sending a notification to a sender of the communication and
wherein the notification comprises a result of the comparison of the group type with the communication type, a recommendation to not send the communication to the group and an option for the sender to override the recommendation and send the communication to the group before a timer that indicates how long the group type will prevail in the group expires.

19. The system of claim 18, wherein the group type is determined by a machine learning process.

20. The system of claim 18, wherein the determining the group type comprises an aspect based sentiment analysis using a machine learning process.

* * * * *